US012131246B2

(12) United States Patent
Kato et al.

(10) Patent No.: US 12,131,246 B2
(45) Date of Patent: Oct. 29, 2024

(54) DISTRIBUTED DEEP LEARNING SYSTEM, DISTRIBUTED DEEP LEARNING METHOD, AND COMPUTING INTERCONNECT DEVICE

(71) Applicant: Nippon Telegraph and Telephone Corporation, Tokyo (JP)

(72) Inventors: Junichi Kato, Tokyo (JP); Kenji Kawai, Tokyo (JP); Huycu Ngo, Tokyo (JP); Yuki Arikawa, Tokyo (JP); Tsuyoshi Ito, Tokyo (JP); Takeshi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 939 days.

(21) Appl. No.: 17/255,209

(22) PCT Filed: May 27, 2019

(86) PCT No.: PCT/JP2019/020906
§ 371 (c)(1),
(2) Date: Dec. 22, 2020

(87) PCT Pub. No.: WO2020/003849
PCT Pub. Date: Jan. 2, 2020

(65) Prior Publication Data

US 2021/0216855 A1 Jul. 15, 2021

(30) Foreign Application Priority Data

Jun. 25, 2018 (JP) ................................ 2018-119727

(51) Int. Cl.
*G06N 3/045* (2023.01)
*G06N 3/063* (2023.01)
*G06N 5/043* (2023.01)

(52) U.S. Cl.
CPC ............ *G06N 3/045* (2023.01); *G06N 3/063* (2013.01); *G06N 5/043* (2013.01)

(58) Field of Classification Search
CPC ........ G06N 3/045; G06N 3/063; G06N 3/084; G06N 5/043
See application file for complete search history.

(56) References Cited

U.S. PATENT DOCUMENTS

2019/0312772 A1* 10/2019 Zhao ...................... G06N 3/084
2019/0324759 A1* 10/2019 Yang ...................... G06N 3/045
(Continued)

FOREIGN PATENT DOCUMENTS

EP 3396546 A1 * 10/2018 ............ G06N 3/045

OTHER PUBLICATIONS

Feng Yan, "Performance Modeling and Scalability Optimization of Distributed Deep Learning Systems", Aug. 10-13, 2015, Sydney, NSW, Australia (c) 2015 ACM, pp. 10 (Year: 2015).*
(Continued)

*Primary Examiner* — Chau T Nguyen
(74) *Attorney, Agent, or Firm* — Slater Matsil, LLP

(57) ABSTRACT

A distributed deep learning system that can achieve speeding-up by processing learning in parallel at a large number of learning nodes connected with a communication network and perform faster cooperative processing among the learning nodes connected through the communication network is provided. The distributed deep learning system includes: a plurality of computing interconnect devices 1 connected with each other through a ring communication network 3 through which communication is possible in one direction; and a plurality of learning nodes 2 connected with the respective computing interconnect devices 1 in a one-to-one relation, and each computing interconnect device 1 executes communication packet transmission-reception processing
(Continued)

between the learning nodes 2 and All-reduce processing simultaneously in parallel.

9 Claims, 25 Drawing Sheets

(56) References Cited

U.S. PATENT DOCUMENTS

2019/0324856 A1* 10/2019 Zhao ...................... G06N 3/084
2019/0325302 A1* 10/2019 Savic ..................... G06N 3/084

OTHER PUBLICATIONS

Xing et al., "Strategies and Principles of Distributed Machine Learning on Big Data", published in 2016, from journal homepage: www.elsevier.com/locate/eng, pp. 17 (Year: 2016).*
Ooi et al., "Singa: A Distributed Deep Learning Platform", published in 2015, publication rights licensed to ACM, pp. 4 (Year: 2015).*
Dean et al., "Large Scale Distributed Deep Networks", published in 2012, from Google Inc., Mountain View, CA, pp. 9 (Year: 2012).*
Akiba, et al., "Extremely Large Minibatch SGD: Training ResNet-50 on ImageNet in 15 Minutes," Literature—https://arxiv.org/abs/1711.04325, Nov. 12, 2017, 4 pages.
Goyal, et al., "Accurate, Large Mini batch SGD: Training Image Net in 1 Hour," Literature—https://arxiv.org/abs/1706.02677, Jun. 8, 2017, 12 pages.
Xu et al., "With NVIDIA Tesla P100 GPU deep learning performance," Literature—http://ja.community.dell.com/techcenter/m/mediagallery/3765/download, Oct. 2016, 10 pages.

* cited by examiner

Fig. 7D
| CALCULATION ID | 1CI_0 | 1CI_1 | 1CI_2 | 1CI_3 |
|---|---|---|---|---|
| 1 | PARENT | CHILD | CHILD | CHILD |
| 2 | PARENT | CHILD | NO ROLE | CHILD |
| 3 | PARENT | CHILD | NO ROLE | NO ROLE |
| 4 | NO ROLE | NO ROLE | PARENT | CHILD |
| ... | | | | |
Fig. 8A
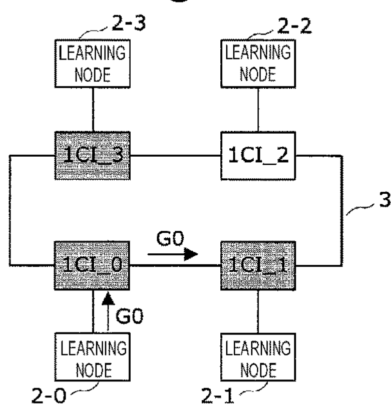
Fig. 8B
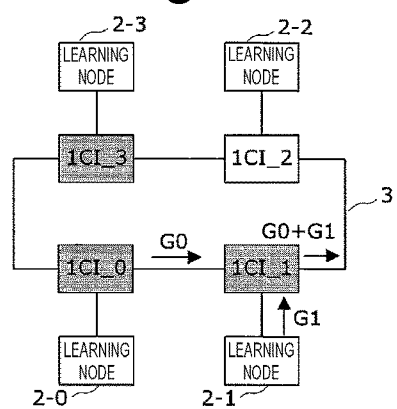

DISTRIBUTED DEEP LEARNING SYSTEM, DISTRIBUTED DEEP LEARNING METHOD, AND COMPUTING INTERCONNECT DEVICE

CROSS-REFERENCE TO RELATED APPLICATIONS

This application is a national phase entry of PCT Application No. PCT/JP2019/020906, filed on May 27, 2019, which claims priority to Japanese Application No. 2018-119727, filed on Jun. 25, 2018, which applications are hereby incorporated herein by reference.

TECHNICAL FIELD

The present invention relates to a distributed learning system, a distributed learning method, and a computing interconnect device that execute, in a distributed and cooperative manner at a plurality of learning nodes, deep learning that is machine learning using a neural network.

BACKGROUND

Service sophistication and added-value provision have been actively performed through utilization of machine learning on various kinds of information and data. Such machine learning often requires a large amount of calculation resource. In particular, in machine learning using a neural network, which is called deep learning, a large amount of learning data needs to be processed in learning through which configuration parameters of the neural network are optimized. Parallel processing at a plurality of arithmetic devices is one solution to speed up the learning processing.

Service sophistication and added-value provision have been actively performed through utilization of machine learning on various kinds of information and data. Such machine learning often requires a large amount of calculation resource. In particular, in machine learning using a neural network, which is called deep learning, a large amount of learning data needs to be processed in learning through which configuration parameters of the neural network are optimized. Parallel processing at a plurality of arithmetic devices is one solution to speed up the learning processing.

For example, Non Patent Literature 1 discloses a distributed deep learning system in which four learning nodes 300-1 to 300-4, an InfiniBand switch 301, and a head node 302 are connected with each other through an InfiniBand network as illustrated in FIG. 26. Four graphics processing units (GPU) are mounted on each of the learning nodes 300-1 to 300-4. In the distributed deep learning system disclosed in Non Patent Literature 1, learning calculation is processed in parallel at the four learning nodes 300-1 to 300-4 to achieve speeding-up.

Non Patent Literature 2 discloses a configuration in which a learning node (GPU server) and an Ethernet (registered trademark) switch are connected with each other through an Ethernet network, eight GPUs being mounted on the learning node. Non Patent Literature 2 discloses examples in which one learning node, two learning nodes, four learning nodes, eight learning nodes, 16 learning nodes, 32 learning nodes, and 44 learning nodes are used, respectively. In a system disclosed in Non Patent Literature 2, machine learning is performed by using distributed synchronous stochastic gradient descent (distributed synchronous SGD). Specifically, the machine learning is performed through the following procedure.

(I) Part of learning data is extracted. The extracted set of learning data is referred to as a mini batch.

(II) The mini batch is divided into pieces in the number of GPUs, and the divided pieces are allocated to the respective GPUs.

(III) Each GPU calculates a loss function L(w), which is an index of deviation of, from an answer (referred to as teacher data), an output value from a neural network into which the learning data allocated in (II) is input. In the process of calculation of the loss function, the output value is sequentially calculated from an input-side layer toward an output-side layer in the neural network, and thus the process is referred to as forward propagation.

(IV) Each GPU calculates a partial differential value (gradient) of the loss function value calculated at (III) with respect to each configuration parameter (such as a weight of the neural network) of the neural network. In this process, the gradient with respect to configuration parameters of each layer is sequentially calculated from an output-side layer toward an input-side layer in the neural network, and thus the process is referred to as back propagation.

(V) The average of the gradients calculated at the respective GPUs is calculated.

(VI) Each GPU updates the configuration parameters of the neural network with the gradient average value calculated in (V) by using stochastic gradient descent (SGD) so that the loss function L(w) decreases. The stochastic gradient descent is calculation processing to decrease the loss function L(w) by changing the value of each configuration parameter by a finite amount in the direction of the gradient. Through repetition of this processing, the neural network is updated to a neural network with a smaller loss function L(w), in other words, a neural network having higher accuracy and capable of providing an output closer to the answer.

Non Patent Literature 3 discloses a distributed deep learning system having a configuration in which 128 learning nodes are connected with each other through an InfiniBand network, eight GPUs being mounted on each learning node.

In a distributed deep learning system of any of Non Patent Literatures 1 to 3, as the number of learning nodes increases, learning speed increases and learning time can be reduced. In this case, to calculate the average value of neural-network configuration parameters such as gradients calculated at learning nodes, calculation such as average value calculation needs to be performed by transmitting and receiving the configuration parameters between the learning nodes or between each learning node and the head node of Non Patent Literature 1.

However, as the number of nodes is increased to increase the number of parallel processes, a necessary amount of communication processing rapidly increases. When arithmetic processing such as average value calculation and data transmission-reception processing are performed by software at learning nodes and a head node as in the conventional technologies, the amount of overhead along with communication processing increases, which makes it difficult to sufficiently increase learning efficiency.

Non Patent Literature 3 discloses the relation among a required time taken for performing 100 cycles of learning processing, a time taken for communication in the required time, and the number of GPUs. According to the relation, the time taken for communication increases as the number of GPUs increases, and in particular, the time abruptly increases when the number of GPUs exceeds 512.

CITATION LIST

Non-Patent Literature

Non Patent Literature 1: Rengan Xu and Nishanth Dandapanthu, "Performance of deep learning using NVIDIA (registered trademark) Tesla (registered trademark) P100 GPU", Dell Inc., 2016, the Internet <http://ja.community.dell.com/techcenter/m/mediagallery/3765/download>

Non Patent Literature 2: Priya Goyal, Piotr Dollar, Ross Girshick, Pieter Noordhuis, Lukasz Wesolowski, Aapo Kyrola, Andrew Tulloch, Yangqing Jia, Kaiming He, "Accurate, Large Minibatch SGD: Training ImageNet in 1 Hour", U.S. Cornell University library, arXiv: 1706.02677, 2017, the Internet <https://arxiv.org/abs/1706.02677>

Non Patent Literature 3: Takuya Akiba, Shuji Suzuki, Keisuke Fukuda, "Extremely Large Minibatch SGD: Training ResNet-50 on ImageNet in 15 Minutes", U.S. Cornell University library, arXiv:1711.04325, 2017, the Internet <https://arxiv.org/abs/1711.04325>.

SUMMARY

Technical Problem

Embodiments of the present invention are intended to solve the above-described problem and provide a distributed deep learning system that can achieve speeding-up by processing learning in parallel at a large number of learning nodes connected with a communication network and perform faster cooperative processing among the learning nodes connected through the communication network.

Means for Solving the Problem

To solve the above-described problem, a distributed deep learning system according to embodiments of the present invention includes: a plurality of computing interconnect devices connected with each other through a ring communication network through which communication is possible in one direction; and a plurality of learning nodes connected with the respective computing interconnect devices in a one-to-one relation, each computing interconnect device includes a first reception unit configured to receive a packet transmitted from a learning node connected with the own computing interconnect device and acquire node data stored in the packet, a second reception unit configured to receive a packet transmitted from a computing interconnect device adjacent to the own computing interconnect device and upstream in the communication network and acquire forwarding data stored in the packet, a first sorting unit configured to sort the forwarding data acquired by the second reception unit in accordance with a reception completion flag that is included in the packet received by the second reception unit and indicates completion or incompletion of reception of the packet and a role allocated to the own computing interconnect device in advance, a second sorting unit configured to sort the node data acquired by the first reception unit in accordance with the reception completion flag included in the packet received by the first reception unit and the role, a first transmission unit configured to packetize the node data sorted by the second sorting unit or the forwarding data sorted by the first sorting unit and transmit the packetized data to a computing interconnect device adjacent to the own computing interconnect device and downstream in the communication network, and a second transmission unit configured to packetize the forwarding data sorted by the first sorting unit and transmit the packetized forwarding data to the learning node connected with the own computing interconnect device, the first sorting unit sorts the forwarding data to the first transmission unit and the second transmission unit when the reception completion flag indicates incompletion of reception of the packet and the role is a parent, and discards the forwarding data when the reception completion flag indicates completion of reception of the packet and the role is a parent, the second sorting unit sorts the node data to the first transmission unit when the reception completion flag indicates incompletion of reception of the packet and the role is a parent, and each learning node includes a neural network configured to output a calculation result upon inputting of learning data, a third transmission unit configured to packetize data and transmit the packetized data to a computing interconnect device connected with the own learning node, a third reception unit configured to receive a packet transmitted from the computing interconnect device connected with the own learning node and acquire the forwarding data stored in the packet, and a configuration parameter update unit configured to update configuration parameter data of the neural network based on the forwarding data acquired by the third reception unit.

In the distributed deep learning system according to embodiments of the present invention, the computing interconnect device may further include a calculator configured to perform calculation based on inputting of the forwarding data sorted by the first sorting unit and the node data sorted by the second sorting unit, the first sorting unit may sort the forwarding data to the calculator when the reception completion flag indicates incompletion of reception of the packet and the role is a child, the second sorting unit may sort the node data to the calculator when the reception completion flag indicates incompletion of reception of the packet and the role is a child, and the calculator may output a result of calculation based on inputting of the forwarding data and the node data to the first transmission unit.

In the distributed deep learning system according to embodiments of the present invention, the computing interconnect device may further include a configuration parameter memory having a function to store the node data and a configuration parameter update calculation unit configured to calculate updated configuration parameter data upon inputting of the forwarding data sorted by the first sorting unit and data stored in the configuration parameter memory and update the data stored in the configuration parameter memory, the first sorting unit may sort the forwarding data to the configuration parameter update calculation unit when the reception completion flag indicates incompletion of reception of the packet and the role is a parent, the configuration parameter update calculation unit may output the calculated updated configuration parameter data to the first transmission unit and the second transmission unit, the first transmission unit may packetize the updated configuration parameter data and transmit the packetized updated configuration parameter data to the computing interconnect device adjacent to the own computing interconnect device and downstream in the communication network, and the second transmission unit may packetize the updated configuration parameter data and transmit the packetized updated configuration parameter data to the learning node connected with the own computing interconnect device.

A distributed deep learning method according to embodiments of the present invention is a distributed deep learning method in a distributed deep learning system including a plurality of computing interconnect devices connected with each other through a ring communication network through which communication is possible in one direction, and a plurality of learning nodes connected with the respective computing interconnect devices in a one-to-one relation, and the distributed deep learning method includes: a first reception step in which each computing interconnect device receives a packet transmitted from a learning node connected with the own computing interconnect device and acquires node data stored in the packet; a second reception step in which the computing interconnect device receives a packet transmitted from a computing interconnect device adjacent to the own computing interconnect device and upstream in the communication network and acquires forwarding data stored in the packet; a first sorting step in which the computing interconnect device sorts the forwarding data acquired at the second reception step in accordance with a reception completion flag that is included in the packet received at the second reception step and indicates completion or incompletion of reception of the packet and a role allocated to the own computing interconnect device in advance; a second sorting step in which the computing interconnect device sorts the node data acquired at the first reception step in accordance with the reception completion flag included in the packet received at the first reception step and the role; a first transmission step in which the computing interconnect device packetizes the node data sorted at the second sorting step or the forwarding data sorted at the first sorting step and transmits the packetized node data to a computing interconnect device adjacent to the own computing interconnect device and downstream in the communication network; a second transmission step in which the computing interconnect device packetizes the forwarding data sorted at the first sorting step and transmits the packetized forwarding data to the learning node connected with the own computing interconnect device; a neural network calculation step in which each learning node inputs learning data to a neural network and outputs a calculation result; a third transmission step in which the learning node packetizes data and transmits the packetized data to the computing interconnect device connected with the own learning node; a third reception step in which the learning node receives a packet transmitted from the computing interconnect device connected with the own learning node and acquires the forwarding data stored in the packet; and a configuration parameter update step in which the learning node updates configuration parameter data of the neural network based on the forwarding data acquired at the third reception step.

The distributed deep learning method according to embodiments of the present invention may further include: a configuration parameter storage step in which the computing interconnect device stores the node data in a configuration parameter memory; and a configuration parameter update calculation step in which the computing interconnect device calculates updated configuration parameter data upon inputting of the forwarding data sorted at the first sorting step and data stored in the configuration parameter memory and updates the data stored in the configuration parameter memory.

A computing interconnect device according to embodiments of the present invention is one of a plurality of computing interconnect devices connected with each other through a ring communication network through which communication is possible in one direction and connected with a plurality of respective learning nodes in a one-to-one relation, and includes: a first reception unit configured to receive a packet transmitted from a learning node connected with the own computing interconnect device and acquire node data stored in the packet; a second reception unit configured to receive a packet transmitted from a computing interconnect device adjacent to the own computing interconnect device and upstream in the communication network and acquire forwarding data stored in the packet; a first sorting unit configured to sort the forwarding data acquired by the second reception unit in accordance with a reception completion flag that is included in the packet received by the second reception unit and indicates completion or incompletion of reception of the packet and a role allocated to the own computing interconnect device in advance; a second sorting unit configured to sort the node data acquired by the first reception unit in accordance with the reception completion flag included in the packet received by the first reception unit and the role; a first transmission unit configured to packetize the node data sorted by the second sorting unit or the forwarding data sorted by the first sorting unit and transmit the packetized data to a computing interconnect device adjacent to the own computing interconnect device and downstream in the communication network; and a second transmission unit configured to packetize the forwarding data sorted by the first sorting unit and transmit the packetized forwarding data to the learning node connected with the own computing interconnect device, the first sorting unit sorts the forwarding data to the first transmission unit and the second transmission unit when the reception completion flag indicates incompletion of reception of the packet and the role is a parent, and discards the forwarding data when the reception completion flag indicates completion of reception of the packet and the role is a parent, and the second sorting unit sorts the node data to the first transmission unit when the reception completion flag indicates incompletion of reception of the packet and the role is a parent.

The computing interconnect device according to embodiments of the present invention may further include a calculator configured to perform calculation based on inputting of the forwarding data sorted by the first sorting unit and the node data sorted by the second sorting unit, the first sorting unit may sort the forwarding data to the calculator when the reception completion flag indicates incompletion of reception of the packet and the role is a child, the second sorting unit may sort the node data to the calculator when the reception completion flag indicates incompletion of reception of the packet and the role is a child, and the calculator may output a result of calculation based on inputting of the forwarding data and the node data to the first transmission unit.

The computing interconnect device according to embodiments of the present invention may further include: a configuration parameter memory having a function to store the node data; and a configuration parameter update calculation unit configured to calculate updated configuration parameter data upon inputting of the forwarding data sorted by the first sorting unit and data stored in the configuration parameter memory and update the data stored in the configuration parameter memory, the first sorting unit may sort the forwarding data to the configuration parameter update calculation unit when the reception completion flag indicates incompletion of reception of the packet and the role is a parent, the configuration parameter update calculation unit may output the calculated updated configuration parameter data to the first transmission unit and the second transmission unit, the first transmission unit may packetize the updated configuration parameter data and transmit the packetized updated configuration parameter data to the computing interconnect device adjacent to the own computing interconnect device and downstream in the communication network, and the second transmission unit may packetize the updated configuration parameter data and transmit the packetized updated configuration parameter data to the learning node connected with the own computing interconnect device.

Effects of Embodiments of the Invention

According to embodiments of the present invention, a computing interconnect device performs processing of calculating the sum of gradient values calculated at learning nodes and transmitting a result of the calculation back to each learning node, and the processing and transmission-reception processing of communication packets between the learning nodes are executed simultaneously in parallel. Thus, it is possible to achieve speeding-up by processing learning in parallel at a large number of learning nodes connected with a communication network and perform faster cooperative processing among the learning nodes connected through the communication network.

BRIEF DESCRIPTION OF THE DRAWINGS

FIG. 7D is a diagram illustrating a calculation information table for FIGS. 7A to 7C.

FIG. 8A is a diagram for description of the operation of the distributed deep learning system according to the first embodiment of the present invention.

FIG. 8B is a diagram for description of the operation of the distributed deep learning system according to the first embodiment of the present invention.

DETAILED DESCRIPTION OF ILLUSTRATIVE EMBODIMENTS

Embodiments of the present invention will be described below in detail with reference to FIGS. 1 to 25.

First Embodiment

Figure 1:
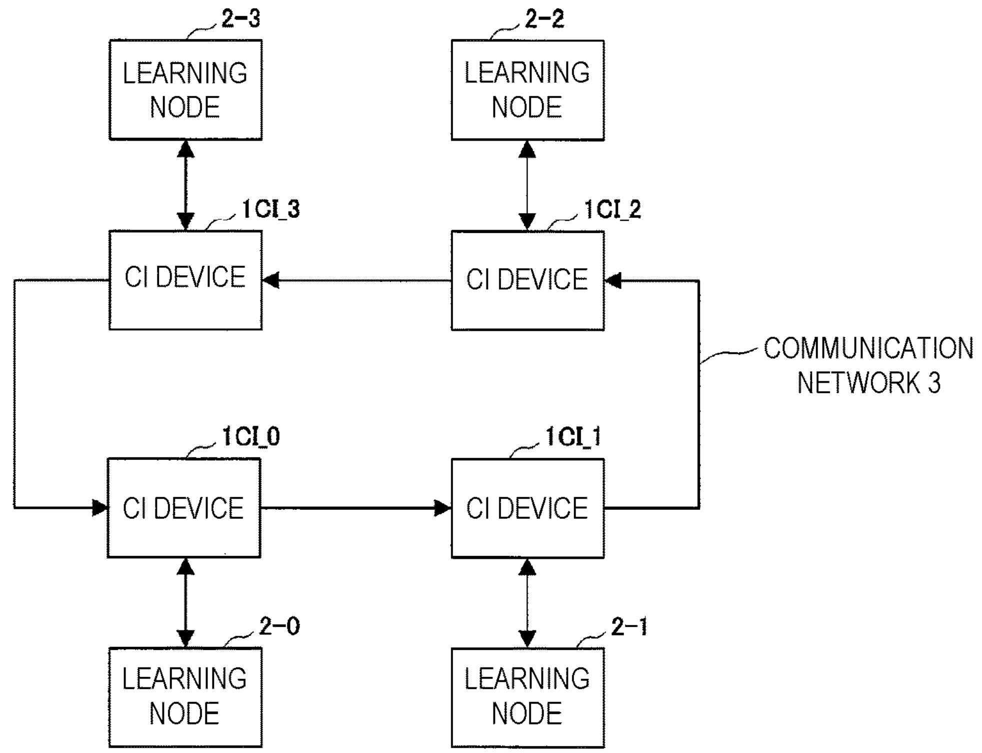
FIG. 1 is a block diagram illustrating the configuration of a distributed deep learning system according to a first embodiment of the present invention.

FIG. 1 is a block diagram illustrating the configuration of a distributed deep learning system according to a first embodiment of the present invention. The distributed deep learning system according to the present embodiment has a structure in which a plurality of computing interconnect (CI) devices 1CI_0 to 1CI_3 are connected with each other through a ring communication network 3. The distributed deep learning system according to the present embodiment also has a structure in which the computing interconnect devices 1CI_0 to 1CI_3 are connected with respective learning nodes 2-0 to 2-3 in a one-to-one relation.

In embodiments of the present invention, computing interconnect devices mean instruments distributed on a network. Hereinafter, the computing interconnect devices 1CI_0 to 1CI_3 are also collectively referred to as a computing interconnect 1. Similarly, the learning nodes 2-0 to 2-3 are also collectively referred to as a learning node 2.

The learning node 2 may be achieved by, for example, a computer including a calculation resource such as a central processing unit (CPU) or a graphics processing unit (GPU), a storage device, and an interface, and a computer program configured to control these hardware resources. Alternatively, the learning node 2 may be achieved by a large scale integration (LSI) circuit formed in a field programmable gate array (FPGA) or an application specific integrated circuit (ASIC).

The computing interconnect devices 1CI_0 to 1CI_3 are connected with each other through a communication network, such as an Ethernet (registered trademark) or an InfiniBand (registered trademark), in which communication is performed through transmission and reception of communication packets.

Each of the computing interconnect devices 1CI_0 to 1CI_3 and the corresponding one of the learning nodes 2-0 to 2-3 may be connected with each other through a communication network such as an Ethernet or an InfiniBand. Alternatively, a connection configuration in which the computing interconnect devices 1CI_0 to 1CI_3 are each directly inserted into an I/O interface such as a PCI Express (registered trademark) interface in the corresponding one of the learning nodes 2-0 to 2-3 may be employed.

DESCRIPTION OF LEARNING NODE

The learning node 2 is a device having a learning function to calculate an output value from a neural network that is a mathematical model and improve the accuracy of the output value by updating configuration parameters of the neural network in accordance with learning data. The neural network is established in each of the learning nodes 2-0 to 2-3. Details of functional blocks included in each of the learning nodes 2-0 to 2-3 will be described later.

DESCRIPTION OF LEARNING

Figure 2:
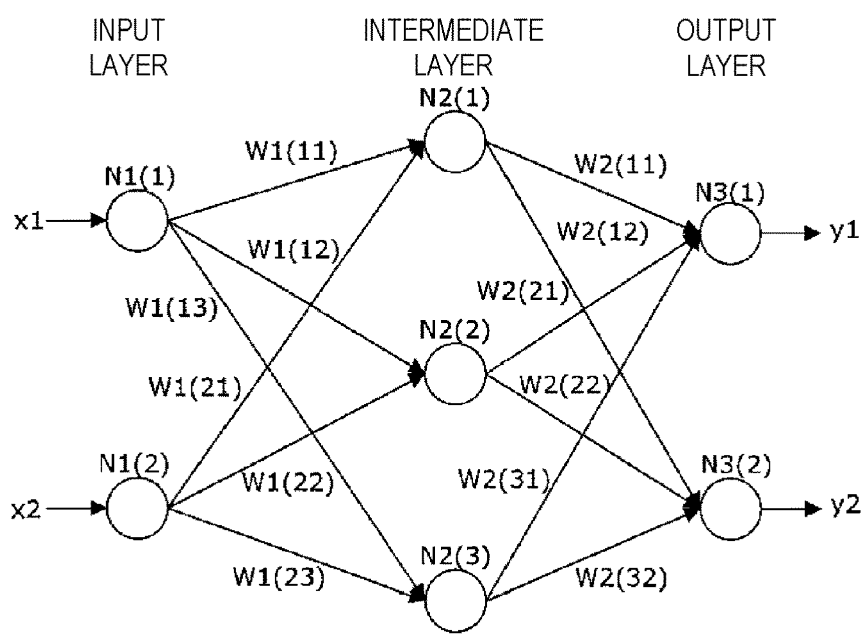
FIG. 2 is a block diagram illustrating the configuration of a double-layer neural network.

Learning processing at the neural network in the learning node 2 will be described with an example of learning with teacher data. FIG. 2 illustrates, as an exemplary neural network, a simple double-layer neural network made of an input layer (first layer), an intermediate layer (second layer), and an output layer (third layer). In FIG. 2, Nk(i) represents the i-th neuron of the k-th layer. In addition, x1 and x2 represent inputs, y1 and y2 represent outputs, w1(11), w1(12), . . . , w1(23) represent weight parameters of the first layer, and w2(11), w2(12), . . . , w2(32) represent weight parameters of the second layer.

In a case of the learning with teacher data, teacher data (answer data) is prepared for the corresponding learning data in advance, and the configuration parameters of the neural network are updated so that an output value from the neural network becomes closer to the teacher data. In the example illustrated in FIG. 2, the configuration parameters of the neural network are the weights w1(11), w1(12), . . . , w1(23), w2(11), w2(12), . . . , w2(32). These configuration parameters are optimized to increase the accuracy of the neural network.

Specifically, a loss function that serves as an index of how far an output value from the neural network is deviated from teacher data is determined, and the configuration parameters are updated so that the loss function decreases. In this example, when y1 and y2 represent output values corresponding to input learning data x1 and x2 and t1 and t2 represent teacher data, a loss function L is given by, for example, a formula below.

Formula 1

$$L = \frac{1}{2}\sum_{k=1}^{2}(y_k - t_k)^2 \tag{1}$$

Subsequently, a vector (referred to as a gradient) having, as components, partial differential values of the loss function L with respect to the respective configuration parameters of the neural network is calculated. In this example, the gradient is as follows.

Formula 2

$$\left(\frac{\partial L}{\partial w1(11)}, \frac{\partial L}{\partial w1(12)}, \dots, \frac{\partial L}{\partial w1(23)}, \frac{\partial L}{\partial w2(11)}, \frac{\partial L}{\partial w2(12)}, \dots, \frac{\partial L}{\partial w2(32)}\right) \tag{2}$$

Subsequently, each configuration parameter of the neural network is updated by using the gradient so that the loss function L further decreases. Various updating methods are available but, for example, gradient descent is used to update the weight parameters as follows.

Formula 3

$$w1(11) \leftarrow w1(11) - \eta \frac{\partial L}{\partial w1(11)} \qquad (3)$$

$$w2(32) \leftarrow w2(32) - \eta \frac{\partial L}{\partial w2(32)}$$

In the formula, n is a constant called a learning rate. Formula ion (3) changes each weight parameter by an amount proportional to the learning rate n in a direction opposite to the gradient, in other words, a direction in which the loss function L decreases. Thus, the loss function L of the neural network after the update is smaller than that before the update.

In this manner, the processing of calculating the loss function L, calculating the gradient, and updating the configuration parameters is performed on a set of pieces of input learning data. Then, next input learning data is input and the same processing is performed for the neural network having the updated configuration parameters to update the configuration parameters. This cycle is repeated to perform update with the neural network for which the loss function L is smaller, thereby performing learning of the neural network.

In the process of calculating the loss function L, output values are sequentially calculated from the input layer of the neural network toward the output layer, and thus this process is referred to as forward propagation. In the process of calculating the gradient, a method referred to as back propagation in which the gradient for configuration parameters of each layer is sequentially calculated from the output layer of the neural network toward the input layer is often used.

Distributed Learning Processing at a Plurality of Learning Nodes

To achieve sufficient accuracy in the learning of the neural network as described above, it is needed to input a large amount of learning data to the neural network and repeat the learning processing, which requires a long time. Reduction of the required time taken for the learning is advantageous.

To reduce the required time taken for the learning, a distributed cooperative learning method is employed in which a plurality of learning nodes 2 of the same neural network are prepared and learning data is divided to the learning nodes 2 to perform the learning in parallel, thereby reducing the total learning time.

Figure 3:
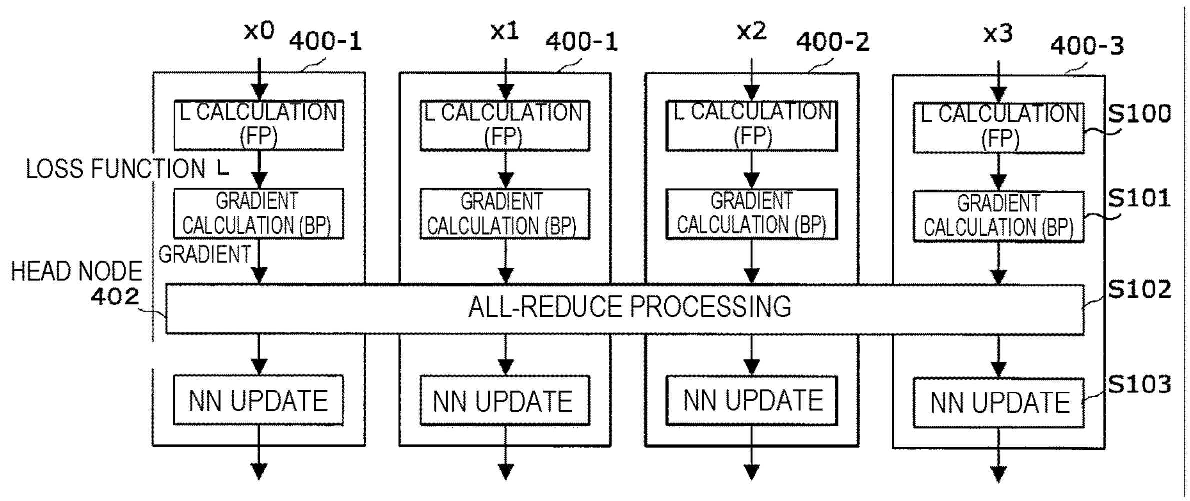
FIG. 3 is a diagram for description of the procedure of conventional distributed deep learning processing.

The following describes the procedure of conventional distributed learning processing with reference to FIG. 3.

First, learning data x is divided into pieces in a number equal to the number of learning nodes 400-0 to 400-3, and the divided pieces are allocated to the respective learning nodes 400-0 to 400-3. In FIG. 3, one x0, one x1, one x2, and one x3 are illustrated as representative learning data allocated to the learning nodes 400-0 to 400-3, but the learning data x0 to x3 is each made of a set of one or a plurality of pieces of learning data.

Subsequently, the learning nodes 400-0 to 400-3 input the respective learning data x0 to x3 into the neural network and calculate the loss functions L by the forward propagation method (step S100 in FIG. 3). One loss function L is obtained for each of the learning nodes 400-0 to 400-3 (for each neural network).

Subsequently, the learning nodes 400-0 to 400-3 calculate, by the back propagation method, the gradients of the loss functions L calculated at step S100 (step S101 in FIG. 3). The gradient of each loss function L is a vector having components for each configuration parameter as indicated in Formula (2).

Subsequently, the average of the gradients calculated by the respective learning nodes 400-0 to 400-3 is calculated at, for example, a head node 402, and the calculation result is transmitted from the head node 402 back to the learning nodes 400-0 to 400-3 (step S102 in FIG. 3). This processing is referred to as "All-reduce processing".

The sum of the gradients may be calculated in place of the average of the gradients. In this case, for example, multiplication of the learning rate n at the next weight-parameter update processing by [1/the number of learning nodes] obtains a result same as that of the calculation of the gradient average value.

Alternatively, the weighted average of the gradients with weighting constants or the sum of the square of each gradient may be used in place of the gradient average.

Lastly, the learning nodes 400-0 to 400-3 each update the weight parameters of the neural network by using the gradient average value calculated at step S102 (step S103 in FIG. 3).

This ends one cycle of distributed learning.

Functional Blocks of Learning Node

Figure 4:
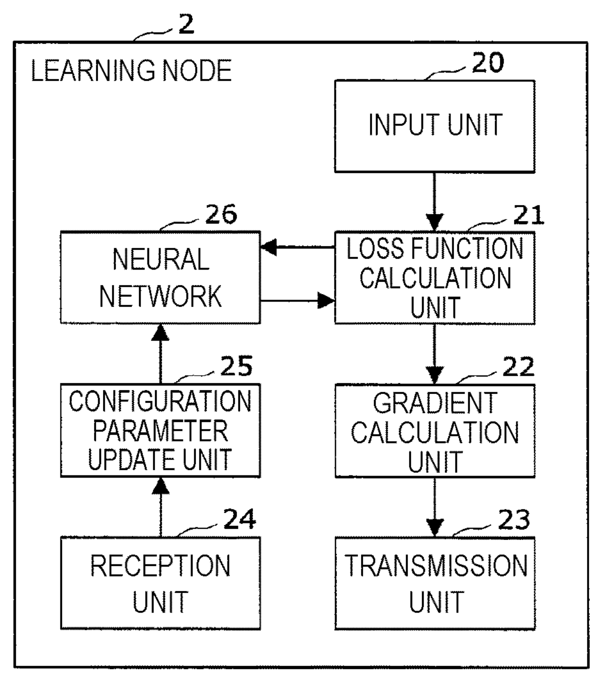
FIG. 4 is a block diagram illustrating the configuration of a learning node according to the first embodiment of the present invention.

The following describes a functional configuration of the learning node 2 before describing the overview of the operation of the distributed deep learning system according to the present embodiment. FIG. 4 is a block diagram illustrating an exemplary configuration of the learning node 2.

The learning node 2 includes an input unit 20, a loss function calculation unit 21, a gradient calculation unit 22, a transmission unit 23, a reception unit 24, a configuration parameter update unit 25, and a neural network 26. The learning nodes 2-0 to 2-3 each have the same configuration.

The input unit 20 receives learning data.

The loss function calculation unit 21 calculates the loss function L for each configuration parameter of the neural network 26 and each learning data upon inputting of the learning data.

After having calculated the gradient of the loss function L for each learning data, the gradient calculation unit 22 generates a tallied value of the gradients for each configuration parameter.

The transmission unit 23 (third transmission unit) packetizes the gradient value calculated by the gradient calculation unit 22 and transmits the packetized gradient value to a computing interconnect device 1. More specifically, the transmission unit 23 writes the gradient calculation result calculated by the gradient calculation unit 22, a sequential number unique to a configuration parameter corresponding to the calculation result, and a corresponding calculation ID to a data payload of a communication packet to be described later and transmits the communication packet to the computing interconnect device 1 connected with the own learning node.

The reception unit 24 (third reception unit) receives the communication packet transmitted from the computing interconnect device 1. More specifically, the reception unit 24 of the learning node takes the calculation result of the gradient sum (forwarding data), the sequential number, and the calculation ID out of the data payload of the communication packet received from the computing interconnect device 1 connected with the own learning node.

The configuration parameter update unit 25 updates the configuration parameter (weight parameter) of the neural network by using the gradient sum stored in the communication packet transmitted from the computing interconnect device 1. More specifically, the configuration parameter update unit 25 updates the configuration parameter of the neural network 26, which is specified by the sequential number, based on the calculation result of the gradient sum.

The neural network 26 calculates an output value from the neural network that is a mathematical model. In the present embodiment, the configuration of the neural network 26 of each learning node 2 in charge of calculation of one calculation ID is identical, which also applies to other embodiments below.

Distributed Processing of Present Embodiment

Figure 5:
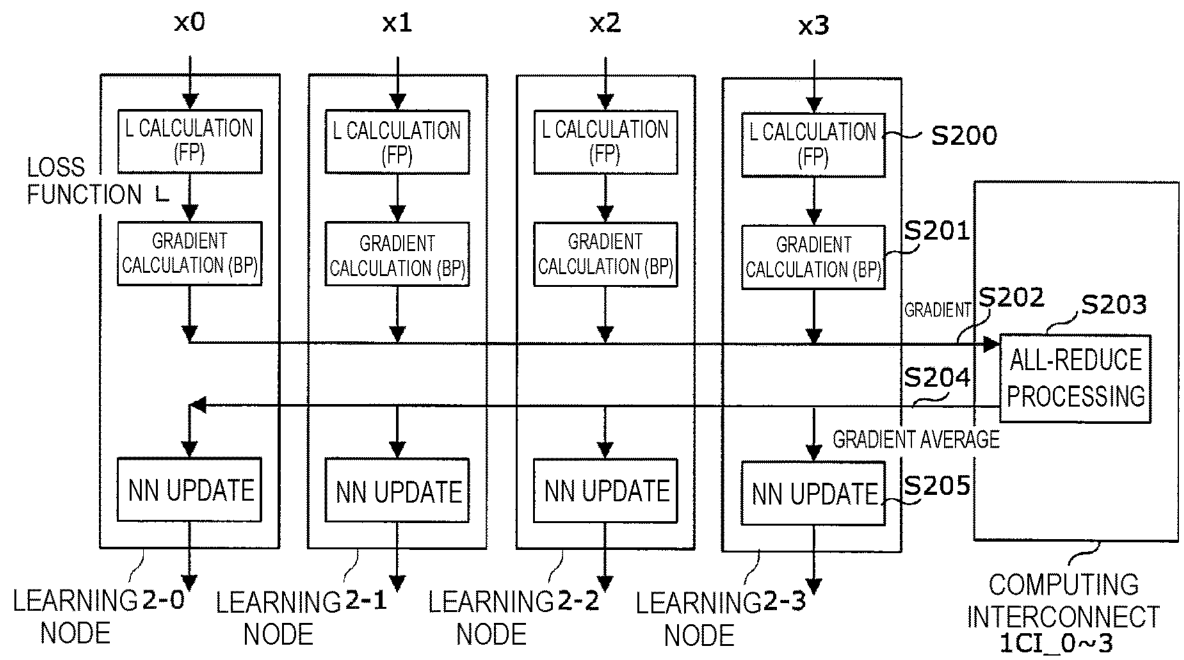
FIG. 5 is a diagram for description of the procedure of distributed learning processing according to the first embodiment of the present invention.

The following describes the procedure of distributed learning processing performed at the learning nodes 2-0 to 2-3 and the computing interconnect devices 1CI_0 to 1CI_3 according to the present embodiment with reference to FIG. 5. In the present embodiment, similarly to the conventional example, the learning nodes 2-0 to 2-3 input the learning data x0 to x3, respectively, to the neural networks 26 and calculate the loss functions L (step S200 in FIG. 5).

More specifically, learning data is input to the input unit 20. Thereafter, the loss function calculation unit 21 calculates the loss function L for each configuration parameter of the neural network 26 and each learning data upon inputting of the learning data.

Subsequently, the gradient calculation unit 22 calculates the gradient of the calculated loss function L (step S201 in FIG. 5). More specifically, the gradient calculation unit 22 calculates the gradient of the loss function L for each learning data and then generates a tallied value of the gradients for each configuration parameter.

Then, the transmission units 23 of the learning nodes 2-0 to 2-3 transmit the respective calculated gradient values to the computing interconnect devices 1CI_0 to 1CI_3 connected with the respective learning nodes 2-0 to 2-3 (step S202 in FIG. 5).

In FIG. 5, similarly to the conventional example of FIG. 3, one x0, one x1, one x2, and one x3 are illustrated as representative learning data allocated to the learning nodes 2-0 to 2-3, but the learning data x0 to x3 is each made of a set of one or a plurality of pieces of learning data.

Subsequently, the computing interconnect devices 1CI_0 to 1CI_3 sequentially add the gradient calculated values transmitted from the transmission units 23 of the learning nodes 2-0 to 2-3 by using the communication network 3 connecting the computing interconnect devices 1CI_0 to 1CI_3. The computing interconnect devices 1CI_0 to 1CI_3 transmit the average value of all gradients, which is obtained as a result, to the learning nodes 2-0 to 2-3 (steps S203 and S204 in FIG. 5). In this manner, in the present embodiment, the All-reduce processing is performed by using the computing interconnect devices 1CI_0 to 1CI_3.

Lastly, the reception units 24 of the learning nodes 2-0 to 2-3 receive the gradient average value transmitted from the computing interconnect devices 1CI_0 to 1CI_3. The configuration parameter update units 25 of the learning nodes 2-0 to 2-3 update each configuration parameter of the neural network 26 by using the received gradient average value (step S205 in FIG. 5).

The sum of the gradients may be calculated in place of the average of the gradients. In this case, for example, multiplication of the learning rate n at the next weight-parameter update processing by [1/the number of learning nodes] obtains a result same as that of the calculation of the gradient average value. Alternatively, the weighted average of the gradients with weighting constants or the root-mean-square of each gradient may be used.

This ends one cycle of the distributed learning of the present embodiment.

Typically, in gradient calculation, the back propagation method is employed in which gradient components for the configuration parameters (weight parameters) of each layer are sequentially calculated from the output layer of the neural network 26 toward the input layer. Thus, when gradient calculation results at the learning nodes 2-0 to 2-3 are transmitted to the computing interconnect devices 1CI_0 to 1CI_3, it is not necessary to wait until the gradient calculation ends for all layers.

Figure 6:
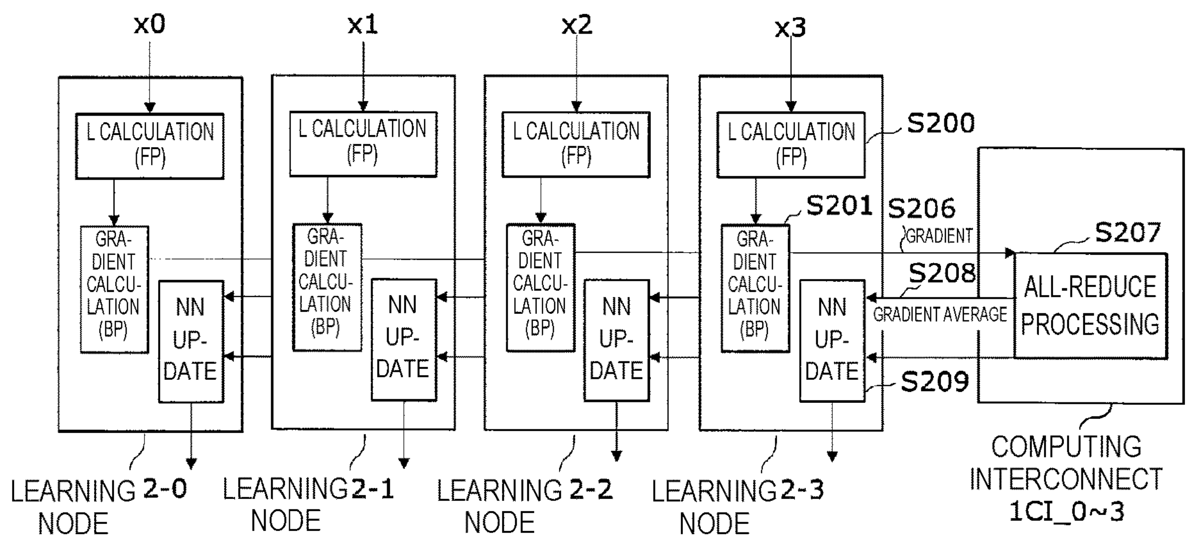
FIG. 6 is a diagram for description of the procedure of the distributed learning processing according to the first embodiment of the present invention.

Thus, as illustrated in FIG. 6, the loss function calculation unit 21 of each of the learning nodes 2-0 to 2-3 first calculates the loss function L (step S200 in FIG. 6) and calculates the gradient of the loss function L (step S201 in FIG. 6) as described above. Thereafter, at step S201, without waiting until the gradient calculation unit 22 ends calculation of gradient components for all configuration parameters, the transmission unit 23 can transmit any already calculated gradient components of configuration parameters to the computing interconnect devices 1CI_0 to 1CI_3 (step S206 in FIG. 6).

The computing interconnect devices 1CI_0 to 1CI_3 calculate the average value of the gradient components transmitted from the learning nodes 2-0 to 2-3 (step S207 in FIG. 6) and transmit the calculated average value of the gradient components to the learning nodes 2-0 to 2-3 (step S208 in FIG. 6).

The reception units 24 of the learning nodes 2-0 to 2-3 receive the calculation result from the computing interconnect devices 1CI_0 to 1CI_3. Thereafter, without waiting until all calculation results are received, the configuration parameter update units 25 of the learning nodes 2-0 to 2-3 update corresponding configuration parameters by using the received average value of the gradient components (step S209 in FIG. 6).

In this manner, in the present embodiment, the gradient calculation, the All-reduce processing, and the configuration parameter update can be performed by a pipeline scheme, and thus further speeding-up of the learning processing can be achieved.

Overview of Operation of Distributed Deep Learning System

Figure 7A:
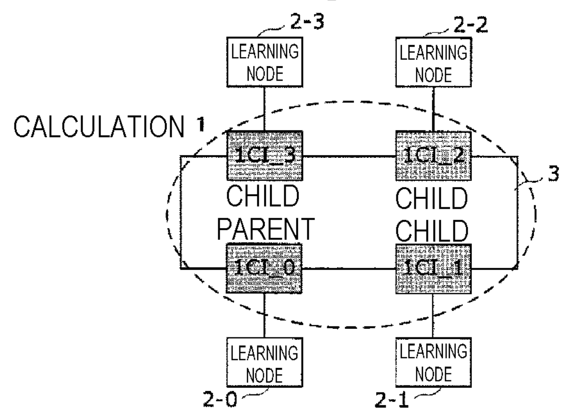
FIG. 7A is a diagram for description of the operation of a distributed deep learning processing system according to the first embodiment of the present invention.
Figure 7B:
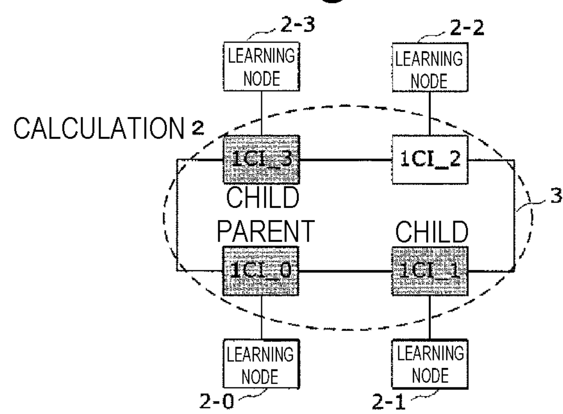
FIG. 7B is a diagram for description of the operation of the distributed deep learning processing system according to the first embodiment of the present invention.
Figure 7C:
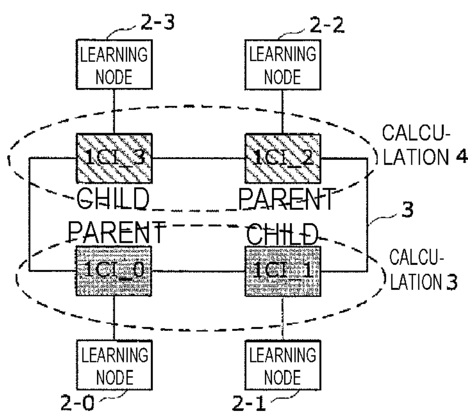
FIG. 7C is a diagram for description of the operation of the distributed deep learning processing system according to the first embodiment of the present invention.

FIGS. 7A, 7B, and 7C are diagrams for description of typical exemplary operation of the distributed deep learning system of the present embodiment.

In the distributed deep learning system, four learning calculations (Calculations 1 to 4) among which a neural network model and input learning data are different are sequentially processed.

First, Calculation 1 is processed at the four learning nodes 2-0 to 2-3 in parallel as illustrated in FIG. 7A. After Calculation 1 ends, Calculation 2 is processed at the three learning nodes 2-0, 2-1, and 2-3 in parallel as illustrated in FIG. 7B.

Lastly, Calculations 3 and 4 are simultaneously processed as illustrated in FIG. 7C. In this case, Calculation 3 is processed at the learning nodes 2-0 and 2-1 in parallel, and Calculation 4 is processed at the learning nodes 2-2 and 2-3 in parallel.

In the distributed deep learning system according to embodiments of the present invention, one of the computing interconnect devices 1CI_0 to 1CI_3 connected with the learning nodes 2 performing parallel learning calculation operates as a parent and the other computing interconnect devices operate as child. In the example of FIG. 7A, the computing interconnect device 1CI_0 operates as a parent, and the computing interconnect devices 1CI_1 to 1CI_3 operate as child.

In FIG. 7B, the computing interconnect device 1CI_0 operates as a parent, and the computing interconnect devices 1CI_1 and 1CI_3 operate as child. When the size of learning data is not large or when processing does not need to be performed so fast, only some of the learning nodes 2-0 to 2-3 connected with the ring communication network 3 are used as illustrated in FIG. 7B in some cases.

In FIG. 7C, for Calculation 3, the computing interconnect device 1CI_0 operates as a parent and the computing interconnect device 1CI_1 operates as a child. For Calculation 4, the computing interconnect device 1CI_2 operates as a parent and the computing interconnect device 1CI_3 operates as a child.

When such operation is performed, a calculation information table (FIG. 7D) indicating which of the roles of "parent", "child", or "no role" is allocated to each computing interconnect device 1 for each calculation is used. The learning nodes 2-0 to 2-3 and the computing interconnect devices 1CI_1 to 1CI_3 share the calculation information table and perform operation specified for each calculation in accordance with the contents of the calculation information table.

Specific Example of Operation of Distributed Deep Learning System

The following describes, with an example of the case of FIG. 7B (case of calculation ID=2), the operation of the distributed deep learning system according to the present embodiment with reference to FIGS. 8A to 8G.

As illustrated in FIG. 8A, the learning node 2-0 connected with the computing interconnect device 1CI_0 transmits a gradient calculation result G0 to the computing interconnect device 1CI_0. The computing interconnect device 1CI_0 forwards the gradient calculation result G0 to the computing interconnect device 1CI_1 through the communication network 3.

As illustrated in FIG. 8B, the computing interconnect device 1CI_1 calculates the sum G0+G1 of the gradient calculation result G0 transmitted from the computing interconnect device 1CI_0 and a gradient calculation result G1 transmitted from the learning node 2-1 directly connected with the computing interconnect device 1CI_1. The computing interconnect device 1CI_1 transmits this calculation result G0+G1 to the computing interconnect device 1CI_2 through the communication network 3.

Figure 8C:
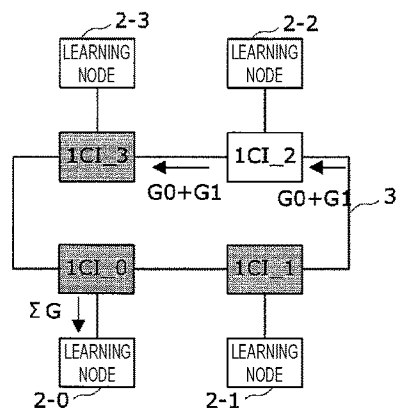
FIG. 8C is a diagram for description of the operation of the distributed deep learning system according to the first embodiment of the present invention.

As illustrated in FIG. 8C, in the present calculation, since the learning node 2-2 has non-calculation role, the computing interconnect device 1CI_2 does not perform summation on the gradient calculation result G0+G1 transmitted from the computing interconnect device 1CI_1. The computing interconnect device 1CI_2 directly transmits the calculation result G0+G1 to the computing interconnect device 1CI_3 through the communication network 3.

Figure 8D:
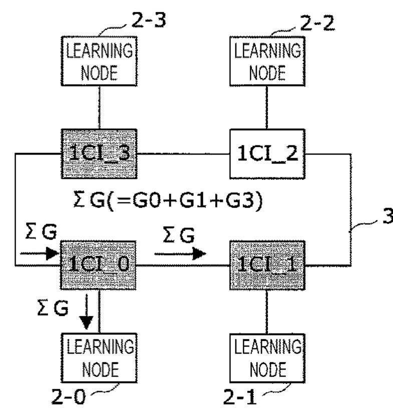
FIG. 8D is a diagram for description of the operation of the distributed deep learning system according to the first embodiment of the present invention.

As illustrated in FIG. 8D, the computing interconnect device 1CI_3 performs calculation similar to that at the computing interconnect device 1CI_1. The computing interconnect device 1CI_3 calculates the sum ΣG=G0+G1+G3 of the gradient sum calculation result G0+G1 transmitted from the computing interconnect device 1CI_2 and a gradient calculation result G3 transmitted from the learning node 2-3 directly connected with the computing interconnect device 1CI_3. The computing interconnect device 1CI_3 transmits this calculation result ΣG to the computing interconnect device 1CI_0 through the communication network 3.

As illustrated in FIG. 8D, having received the gradient sum calculation result ΣG, the computing interconnect device 1CI_0 transmits the received gradient sum ΣG to the learning node 2-0 directly connected therewith and the computing interconnect device 1CI_1.

Figure 8E:
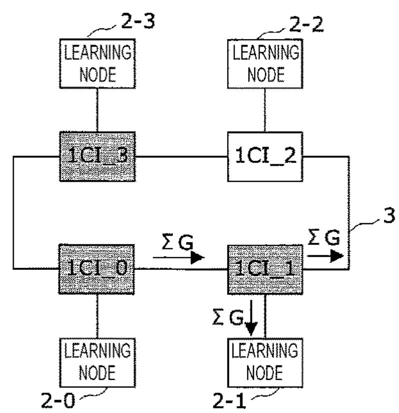
FIG. 8E is a diagram for description of the operation of the distributed deep learning system according to the first embodiment of the present invention.

As illustrated in FIG. 8E, having received the gradient sum ΣG, the computing interconnect device 1CI_1 transmits the gradient sum ΣG to the learning node 2-1 directly connected therewith and the computing interconnect device 1CI_2.

Figure 8F:
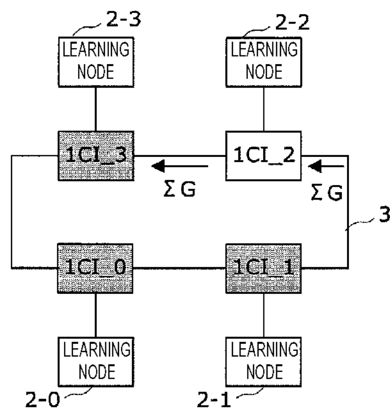
FIG. 8F is a diagram for description of the operation of the distributed deep learning system according to the first embodiment of the present invention.

As illustrated in FIG. 8F, having received the gradient sum ΣG, the computing interconnect device 1CI_2 does not transmit the gradient sum ΣG to the learning node 2-2 directly connected therewith but transmits the gradient sum ΣG only to the computing interconnect device 1CI_3 through the communication network 3.

Figure 8G:
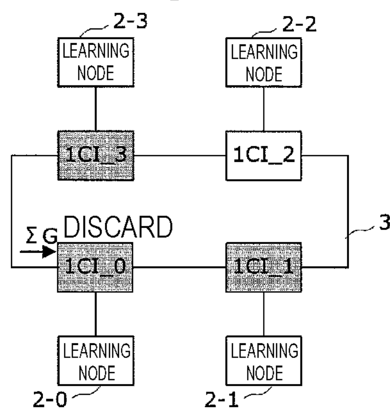
FIG. 8G is a diagram for description of the operation of the distributed deep learning system according to the first embodiment of the present invention.

As illustrated in FIG. 8G, the computing interconnect device 1CI_3 transmits, to the learning node 2-3 directly connected therewith and the computing interconnect device 1CI_0, the gradient sum ΣG transmitted from the computing interconnect device 1CI_2.

Lastly, as illustrated in FIG. 8G, having received the gradient sum ΣG, the computing interconnect device 1CI_0 discards the gradient sum ΣG.

Through the above-described operation, the gradient sum ΣG is transmitted to the learning nodes 2-0, 2-1, and 2-3.

Configuration of Computing Interconnect Device

Figure 9:
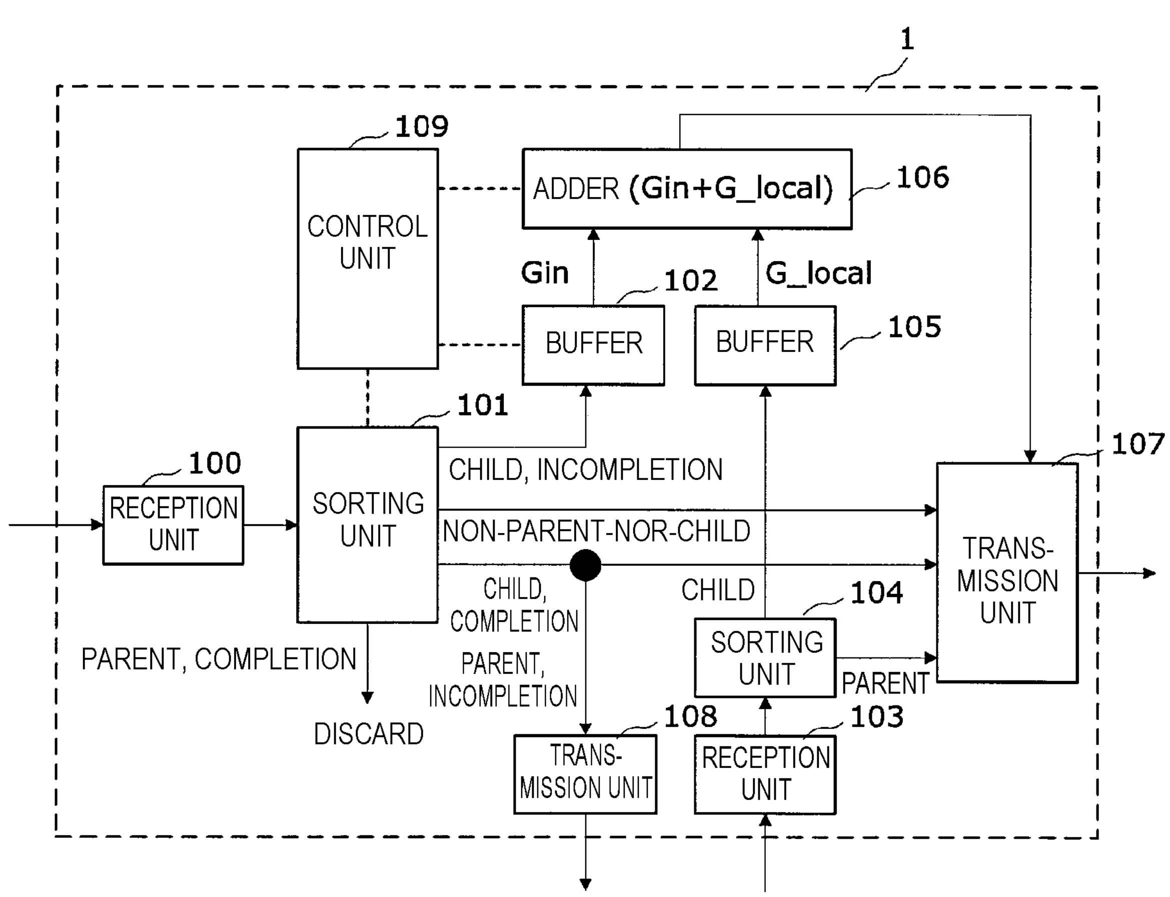
FIG. 9 is a block diagram illustrating the configuration of a computing interconnect device according to the first embodiment of the present invention.

FIG. 9 is a block diagram illustrating an exemplary configuration of the computing interconnect device 1.

The computing interconnect device 1 includes reception units 100 and 103, sorting units 101 and 104, buffer memories 102 and 105, an adder 106, transmission units 107 and 108, and a control unit 109.

The reception unit 100 (second reception unit) receives a communication packet from an adjacent computing interconnect device 1 on the upstream side in the ring communication network 3 and acquires data (forwarding data) stored in the packet. The ring communication network 3 is a communication network through which communication is performed only in one direction (in the present embodiment, the anticlockwise direction). The above-described adjacent computing interconnect device 1 on the upstream side is, for example, a computing interconnect device 1 on the left in FIG. 1.

The sorting unit 101 (first sorting unit) sorts data from the reception unit 100 in accordance with a reception completion flag (completion or incompletion) that indicates whether reception of data included in a communication packet is completed and a role (parent, child, or non-calculation role (non-parent-nor-child)) allocated to the computing interconnect device 1.

The buffer memory 102 temporarily stores data from the sorting unit 101.

The reception unit 103 (first reception unit) receives a communication packet from the learning node 2 directly connected with the computing interconnect device 1 and acquires data (node data) stored in the packet.

The sorting unit 104 (second sorting unit) sorts the data from the reception unit 103 in accordance with the role allocated to the computing interconnect device 1 (the own computing interconnect device).

The buffer memory 105 temporarily stores data from the sorting unit 104.

The adder 106 (calculator) reads gradient values temporarily stored in the buffer memories 102 and 105 and calculates the gradient sum.

The transmission unit 107 (first transmission unit) transmits, to an adjacent computing interconnect device 1 on the downstream side in the ring network 3 (computing interconnect device 1 on the right), a communication packet obtained by packetizing data sorted by the sorting unit 101 or the sorting unit 104.

The transmission unit 108 (second transmission unit) transmits, to the learning node 2 directly connected with the computing interconnect 1, a communication packet obtained by packetizing data sorted by the sorting unit 101.

The control unit 109 controls the buffer memories 102 and 105.

Figure 10:
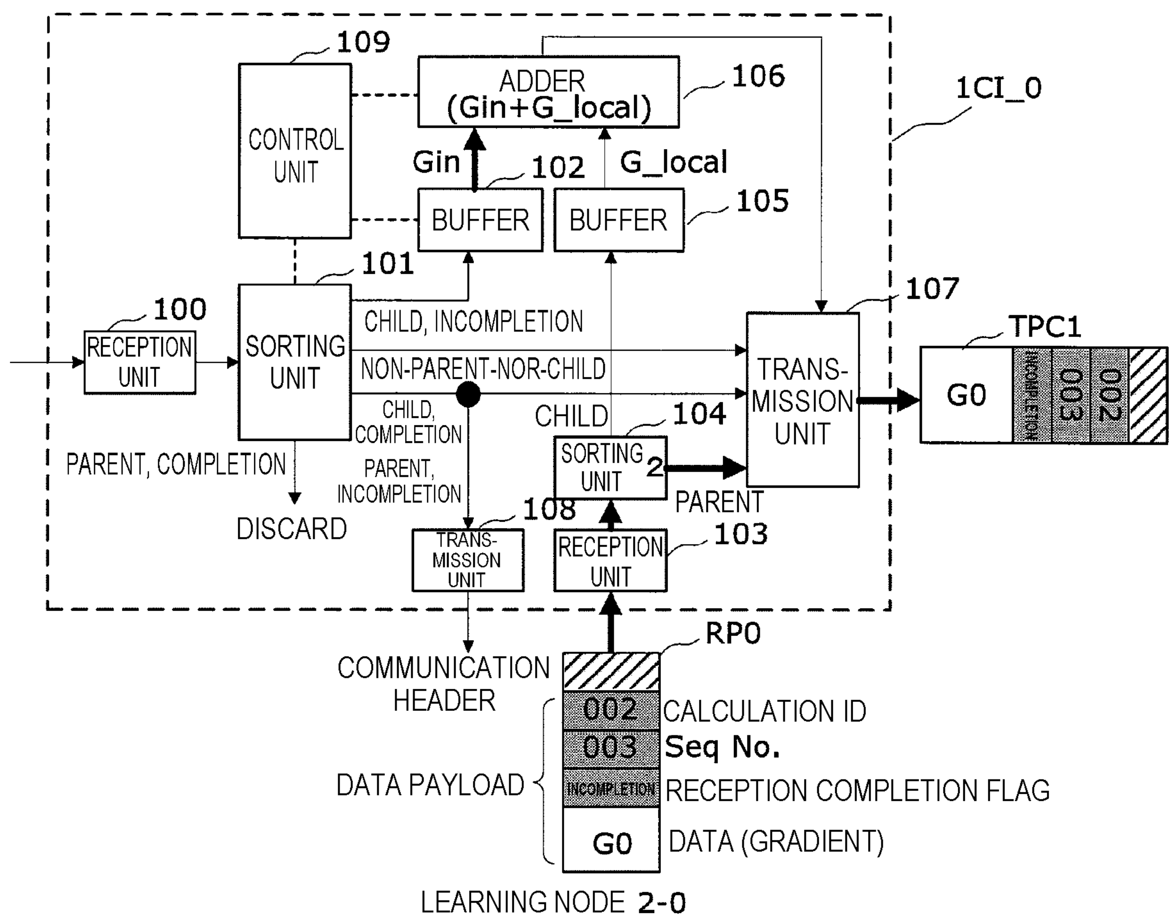
FIG. 10 is a diagram for description of the operation of a computing interconnect device (1CI_0) according to the first embodiment of the present invention.

FIG. 10 is a diagram for description of the operation of the computing interconnect device 1CI_0 in FIG. 8A. As illustrated in FIG. 10, a communication packet is made of a communication header and a data payload.

The data payload of a communication packet RP0 transmitted from the learning node 2-0 stores the gradient value "G0" calculated at the learning node 2-0, a calculation ID "002", a sequential number "003" of the gradient value, and a reception completion flag that indicates completion or incompletion ("incompletion" in the example of FIG. 10) of gradient sum acquisition at the computing interconnect device 1CI_0.

The reception unit 103 of the computing interconnect device 1CI_0 takes the gradient value G0, the calculation ID, the sequential number, and the reception completion flag out of the data payload of the communication packet RP0 received and passes these data to the sorting unit 104.

The sorting unit 104 refers to the calculation information table with the calculation ID received from the reception unit 103 and identifies that the computing interconnect device 1CI_0 is to operate as a "parent" for calculation ID=2. Accordingly, the sorting unit 104 passes the gradient value G0, the calculation ID, the sequential number, and the reception completion flag to the transmission unit 107.

The transmission unit 107 stores the gradient value G0, the calculation ID, the sequential number, and the reception completion flag received from the sorting unit 104 in the data payload of a communication packet TPC1. Then, the transmission unit 107 transmits the communication packet TPC1 to an adjacent computing interconnect device (in the example of FIG. 8A, the computing interconnect device 1CI_1) on the downstream side of the computing interconnect device 1CI_0 through the communication network 3.

Figure 11:
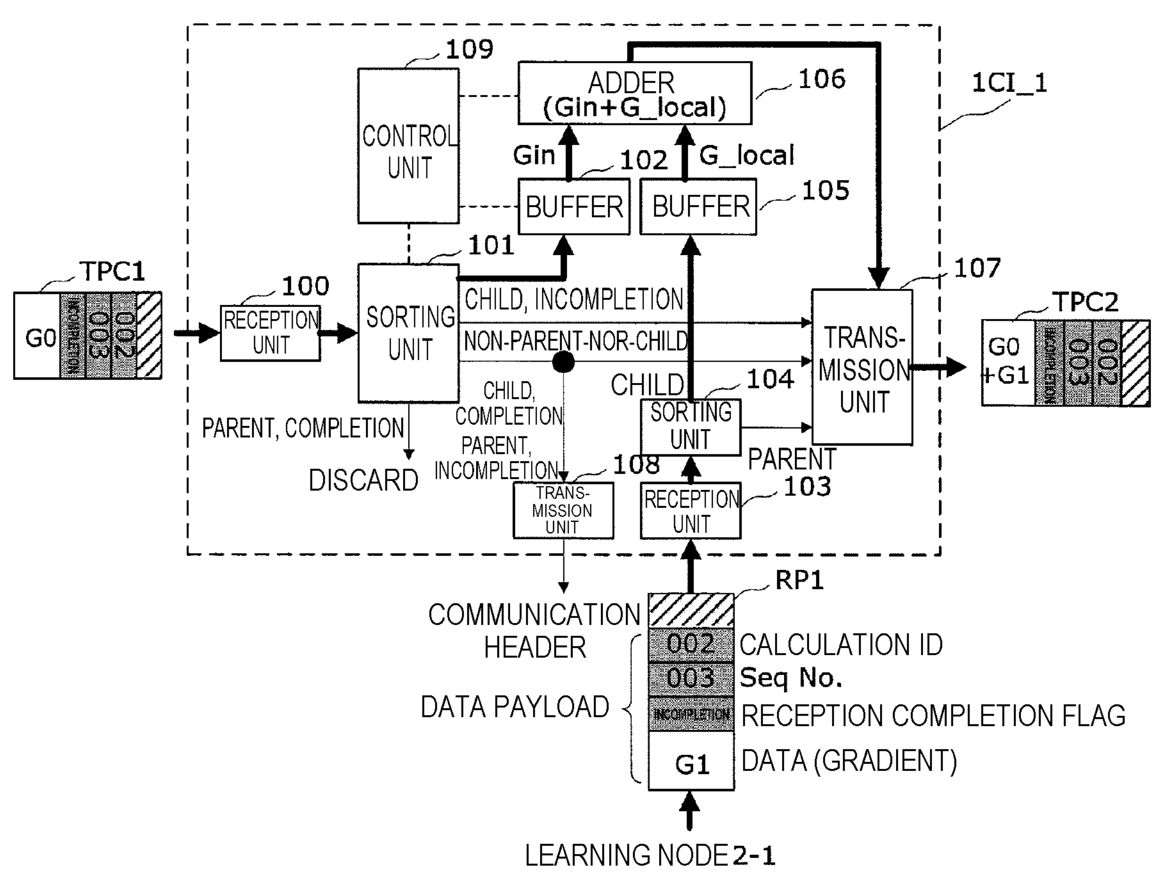
FIG. 11 is a diagram for description of the operation of a computing interconnect device (1CI_1) according to the first embodiment of the present invention.

FIG. 11 illustrates the operation of the computing interconnect device 1CI_1 in FIG. 8B.

The reception unit 100 of the computing interconnect device 1CI_1 takes the gradient value G0, the calculation ID, the sequential number, and the reception completion flag out of the data payload of the communication packet TPC1 received from the computing interconnect device 1CI_0 and passes these data to the sorting unit 101.

The sorting unit 101 identifies that the reception completion flag received from the reception unit 100 indicates "incompletion" and the computing interconnect device 1CI_1 is to operate as a "child" for calculation ID=2 by referring to the calculation information table with the received calculation ID. Accordingly, the sorting unit 101 stores the gradient value G0, the calculation ID, the sequential number, and the reception completion flag in the buffer memory 102.

The reception unit 103 of the computing interconnect device 1CI_1 takes a gradient value G1, a calculation ID, a sequential number, and a reception completion flag out of the data payload of a communication packet RP1 received from the learning node 2-1 directly connected therewith and passes these data to the sorting unit 104.

The sorting unit 104 of the computing interconnect device 1CI_1 refers to the calculation information table with the calculation ID received from the reception unit 103 and identifies that the computing interconnect device 1CI_1 is to operation as a "child" for calculation ID=2. Accordingly, the sorting unit 104 stores the gradient value G0, the calculation ID, the sequential number, and the reception completion flag in the buffer memory 105.

When the gradient values "G0" and "G1" of an identical sequential number are stored in the buffer memory 102 and the buffer memory 105, the control unit 109 of the computing interconnect device 1CI_1 reads the gradient value "G0", the sequential number, and the reception completion flag from the buffer memory 102. Simultaneously, the control unit 109 reads the gradient value "G1", the sequential number, and the reception completion flag from the buffer memory 105 and passes the gradient values "G0" and "G1" to the adder 106.

The adder 106 adds the gradient values "G0" and "G1". The control unit 109 passes the calculation ID, the sequential number and the reception completion flag read from the buffer memory 102 to the transmission unit 107.

The transmission unit 107 of the computing interconnect device 1CI_1 stores, in the data payload of a communication packet TPC2, the gradient sum "G0+G1" calculated by the adder 106 and the calculation ID, the sequential number, and the reception completion flag received from the control unit 109. Then, the transmission unit 107 transmits the communication packet TPC2 to an adjacent computing interconnect device (in the example of FIG. 8B, the computing interconnect device 1CI_2) on the downstream side of the computing interconnect device 1CI_1 through the communication network 3.

Figure 12:
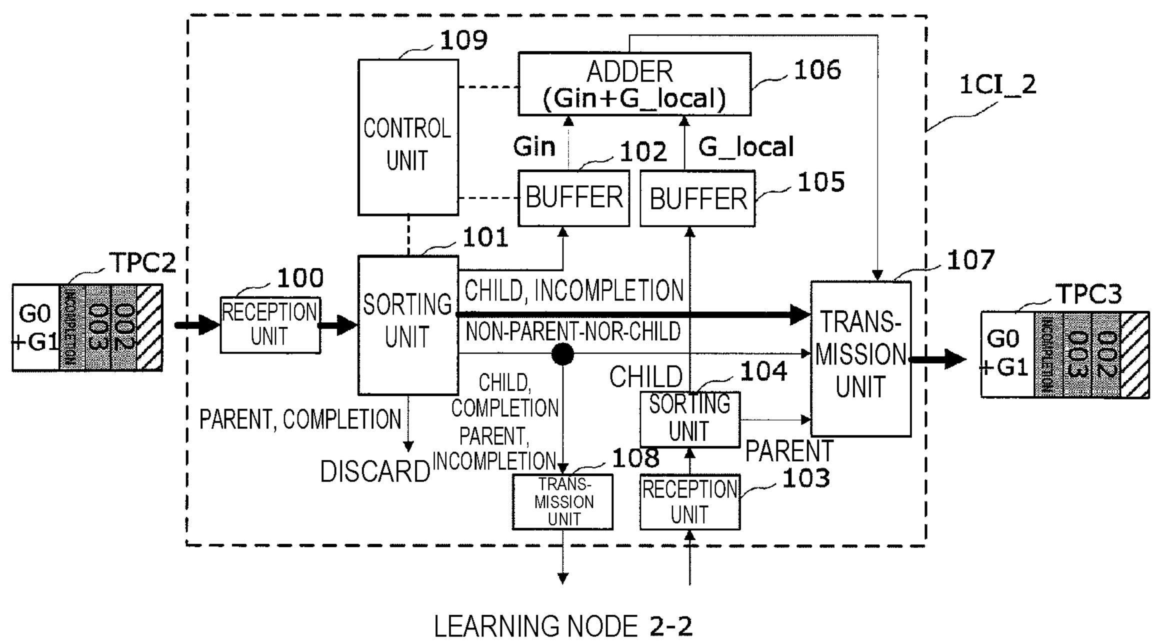
FIG. 12 is a diagram for description of the operation of a computing interconnect device (1CI_2) according to the first embodiment of the present invention.

FIG. 12 illustrates the operation of the computing interconnect device 1CI_2 in FIG. 8C.

The reception unit 100 of the computing interconnect device 1CI_2 takes the gradient value "G0+G1", the calculation ID, the sequential number, and the reception completion flag out of the data payload of the communication packet TPC2 received from the computing interconnect device 1CI_1 and passes these data to the sorting unit 101.

The sorting unit 101 refers to the calculation information table with the received calculation ID and identifies that the computing interconnect device 1CI_2 is to operate as a "non-calculation role (non-parent-nor-child)" for calculation ID=2. Accordingly, the sorting unit 101 transmits the gradient value "G0+G1", the calculation ID, the sequential number, and the reception completion flag to the transmission unit 107.

The transmission unit 107 stores, in the data payload of a communication packet TPC3, the gradient value "G0+G1", the calculation ID, the sequential number, and the reception completion flag received from the sorting unit 101. Then, the transmission unit 107 transmits the communication packet TPC3 to an adjacent computing interconnect device (in the example of FIG. 8C, the computing interconnect device 1CI_3) on the downstream side of the computing interconnect device 1CI_2 through the communication network 3.

Figure 13:
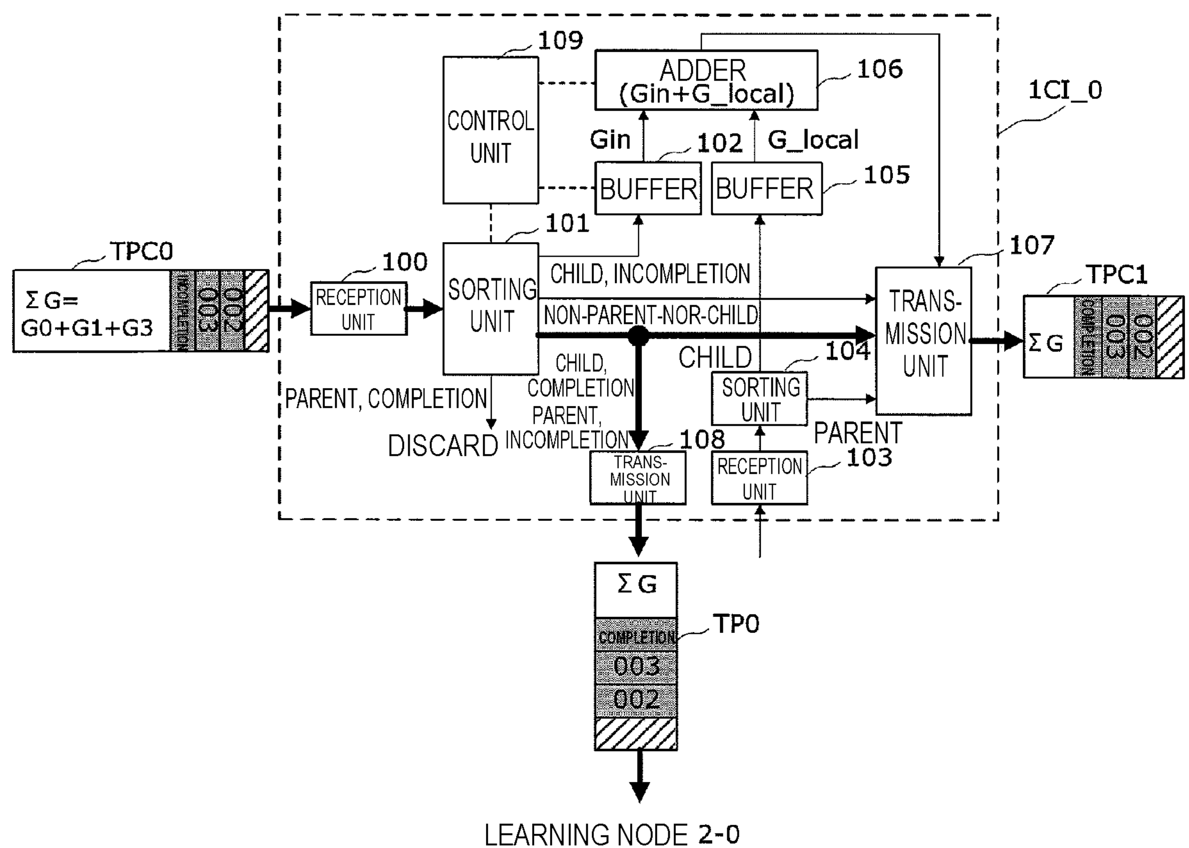
FIG. 13 is a diagram for description of the operation of the computing interconnect device (1CI_0) according to the first embodiment of the present invention.

FIG. 13 illustrates the operation of the computing interconnect device 1CI_0 in FIG. 8D.

The reception unit 100 of the computing interconnect device 1CI_0 receives a communication packet TPC0 from an adjacent computing interconnect device (in the example of FIG. 8D, the computing interconnect device 1CI_3) on the upstream side of the computing interconnect device 1CI_0. Then, the reception unit 100 of the computing interconnect device 1CI_0 takes the gradient sum ΣG (=G0+G1+G3), the calculation ID, the sequential number, and the reception completion flag out of the payload of the received communication packet TPC0 and passes these data to the sorting unit 101.

The sorting unit 101 identifies that the reception completion flag received from the reception unit 100 indicates "incompletion" and the computing interconnect device 1CI_0 is to operate as a "parent" for calculation ID=2 by referring to the calculation information table with the received calculation ID. Accordingly, the sorting unit 101 passes the gradient sum ΣG, the calculation ID, the sequential number, and the reception completion flag to the transmission unit 107 and the transmission unit 108.

In this case, reception of a communication packet in which the reception completion flag indicates "incompletion" from the adjacent computing interconnect device 1CI_3 on the upstream side of the computing interconnect device 1CI_0 as a "parent" means that the communication packet has circulated through the ring communication network 3 and the gradient sum calculation is completed. Thus, the sorting unit 101 of the computing interconnect device 1CI_0 changes the reception completion flag received from the reception unit 100 from "incompletion" to a value indicating "completion" and passes data to the transmission unit 107 and the transmission unit 108.

The transmission unit 107 of the computing interconnect device 1CI_0 stores, in the data payload of the communication packet TPC1, the gradient sum ΣG, the calculation ID, the sequential number, and the reception completion flag received from the sorting unit 101. Then, the transmission unit 107 transmits the communication packet TPC1 to the adjacent computing interconnect device (in the example of FIG. 8D, the computing interconnect device 1CI_1) on the downstream side of the computing interconnect device 1CI_0 through the communication network 3.

The transmission unit 108 of the computing interconnect device 1CI_0 stores, in the data payload of a communication packet TP0, the gradient sum ΣG, the calculation ID, the sequential number, and the reception completion flag received from the sorting unit 101 and transmits the communication packet TP0 to the learning node 2-0.

Figure 14:
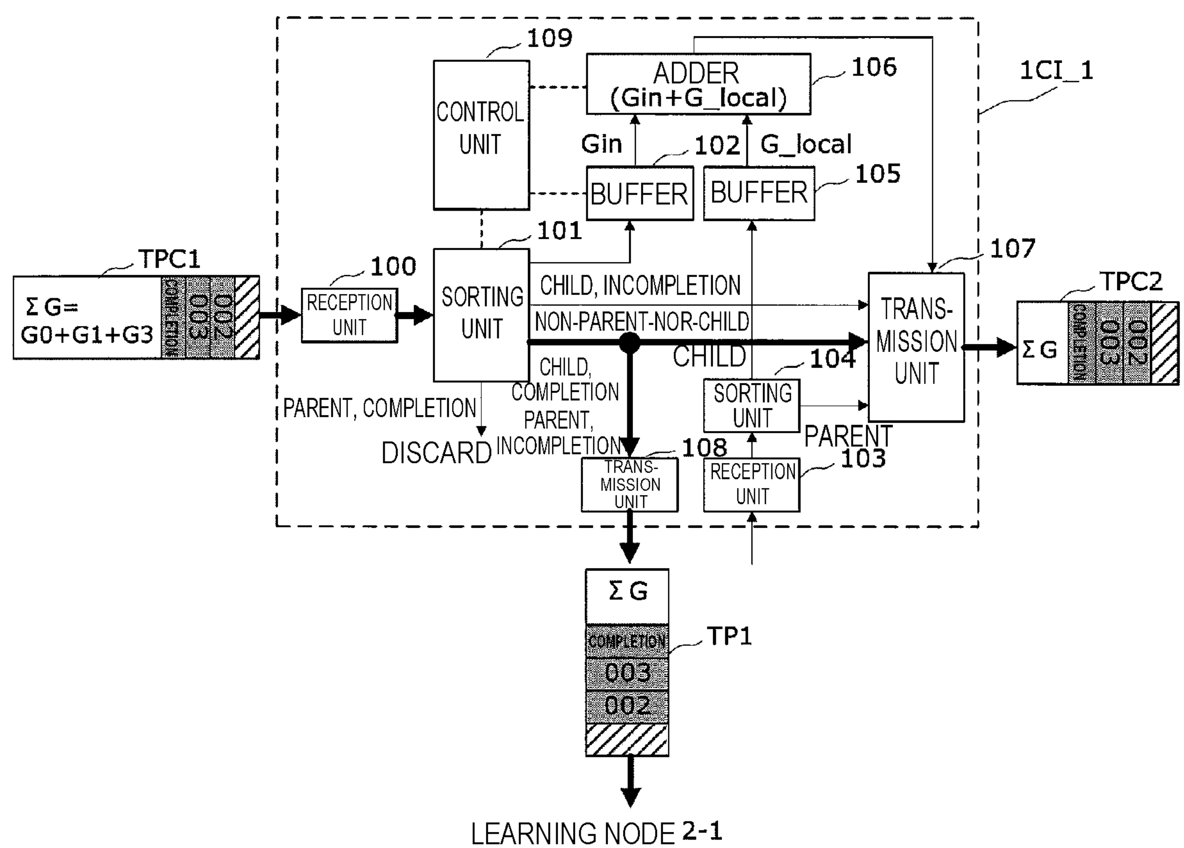
FIG. 14 is a diagram for description of the operation of the computing interconnect device (1CI_1) according to the first embodiment of the present invention.

FIG. 14 illustrates the operation of the computing interconnect device 1CI_1 in FIG. 8E.

The reception unit 100 of the computing interconnect device 1CI_1 takes the gradient sum ΣG, the calculation ID, the sequential number, and the reception completion flag out of the data payload of the communication packet TPC1 received from the computing interconnect device 1CI_0 and passes these data to the sorting unit 101.

The sorting unit 101 identifies that the reception completion flag received from the reception unit 100 indicates "completion" and the computing interconnect device 1CI_1 is to operate as a "child" for calculation ID=2 by referring to the calculation information table with the received calculation ID. Accordingly, the sorting unit 101 passes the gradient sum ΣG, the calculation ID, the sequential number, and the reception completion flag to the transmission unit 107 and the transmission unit 108.

The transmission unit 107 stores, in the data payload of the communication packet TPC2, the gradient sum ΣG, the calculation ID, the sequential number, and the reception completion flag received from the sorting unit 104. Then, the transmission unit 107 transmits the communication packet TPC2 to the adjacent computing interconnect device (in the example of FIG. 8E, the computing interconnect device 1CI_2) on the downstream side of the computing interconnect device 1CI_1.

The transmission unit 108 of the computing interconnect device 1CI_1 stores, in the data payload of a communication packet TP1, the gradient sum ΣG, the calculation ID, the sequential number, and the reception completion flag received from the sorting unit 101 and transmits the communication packet TP1 to the learning node 2-1.

Figure 15:
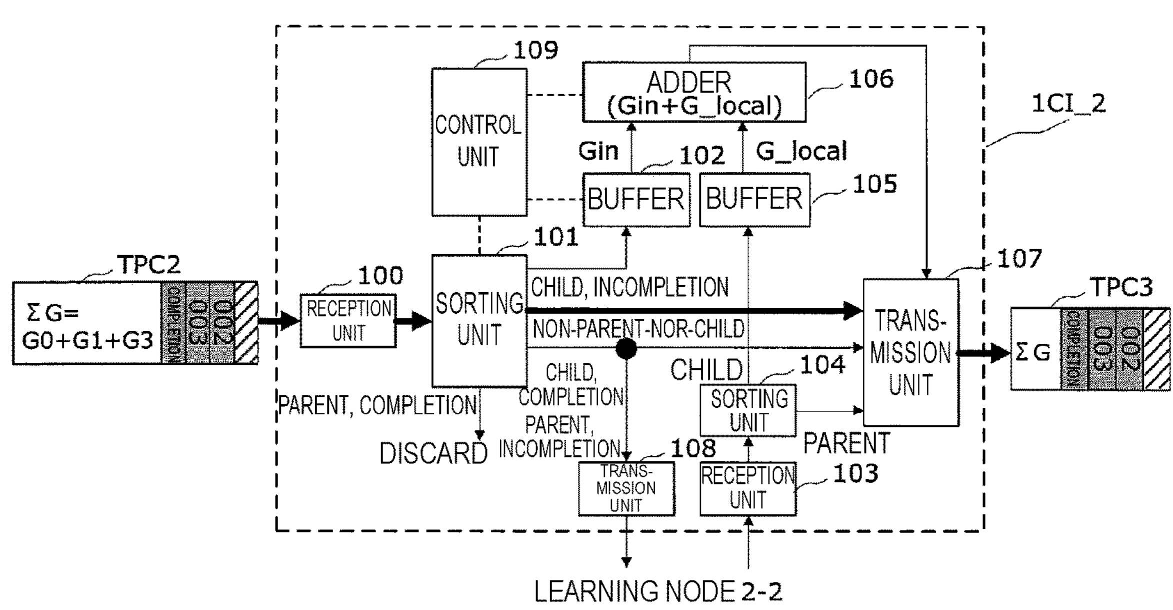
FIG. 15 is a diagram for description of the operation of the computing interconnect device (1CI_2) according to the first embodiment of the present invention.

FIG. 15 illustrates the operation of the computing interconnect device 1CI_2 in FIG. 8F.

The reception unit 100 of the computing interconnect device 1CI_2 takes the gradient sum ΣG, the calculation ID, the sequential number, and the reception completion flag out of the data payload of the communication packet TPC2 received from the computing interconnect device 1CI_1 and passes these data to the sorting unit 101.

The sorting unit 101 refers to the calculation information table with the received calculation ID and identifies that the computing interconnect device 1CI_2 is to operate as a "non-calculation role (non-parent-nor-child)" for calculation ID=2. Accordingly, the sorting unit 101 transmits the gradient sum ΣG, the calculation ID, the sequential number, and the reception completion flag to the transmission unit 107.

The transmission unit 107 stores, in the data payload of the communication packet TPC3, the gradient sum ΣG, the calculation ID, the sequential number, and the reception completion flag received from the sorting unit 101. Then, the transmission unit 107 transmits the communication packet TPC3 to the adjacent computing interconnect device (in the example of FIG. 8F, the computing interconnect device 1CI_3) on the downstream side of the computing interconnect device 1CI_2 through the communication network 3.

Figure 16:
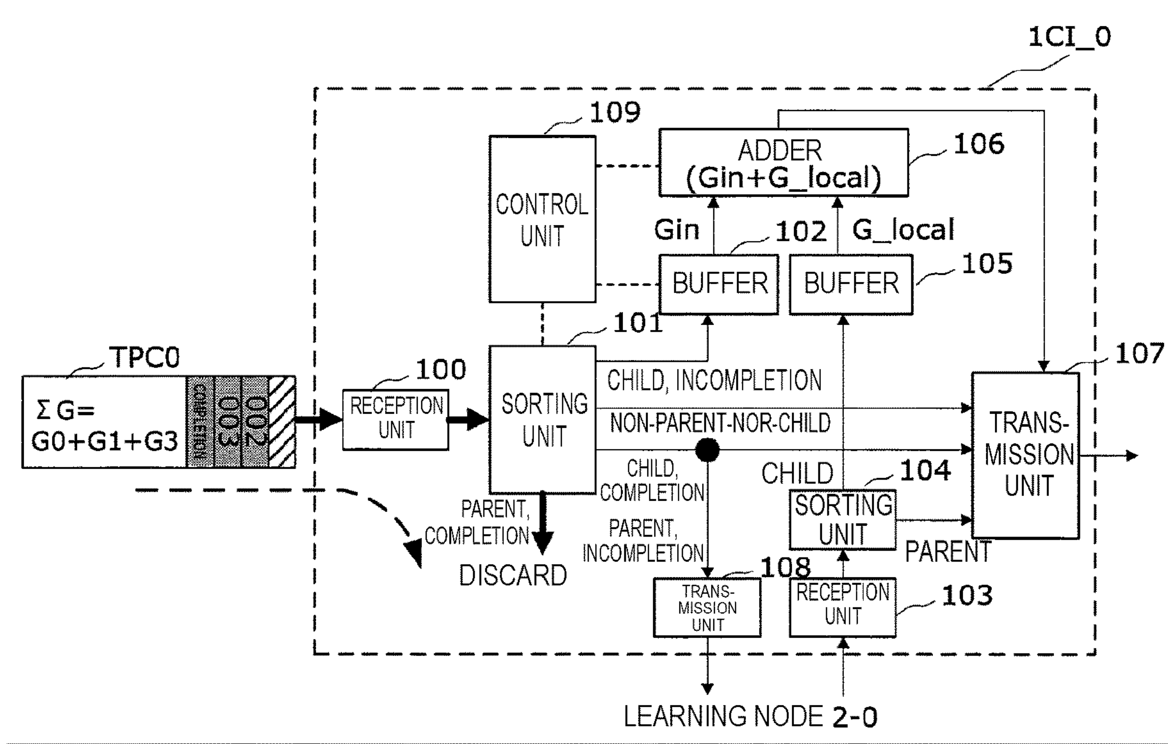
FIG. 16 is a diagram for description of the operation of the computing interconnect device (1CI_0) according to the first embodiment of the present invention.

FIG. 16 illustrates the operation of the computing interconnect device 1CI_0 in FIG. 8G.

The reception unit 100 of the computing interconnect device 1CI_0 takes the gradient sum ΣG, the sequential number, and the reception completion flag out of the payload of the communication packet TPC0 received from the adjacent computing interconnect device (in the example of FIG. 8G, the computing interconnect device 1CI_3) on the upstream side of the computing interconnect device 1CI_0 and passes these data to the sorting unit 101.

The sorting unit 101 identifies that the reception completion flag received from the reception unit 100 indicates "completion" and the computing interconnect device 1CI_0 is to operate as a "parent" for calculation ID=2 by referring to the calculation information table with the received calculation ID. Then, the sorting unit 101 discards the gradient sum ΣG, the calculation ID, the sequential number, and the reception completion flag received from the reception unit 100.

In the above-described example, the sum of gradients is used to perform the weight-parameter update processing but, when a weighted sum of gradients is used in place of the sum of gradients, a weighted sum calculator for Gin and G_local may be used in place of the adder 106. Alternatively, when the squared sum of gradients is used in place of the sum of gradients, a squared sum calculator for Gin and G_local may be used in place of the adder 106. In other words, embodiments of the present invention are also applicable to a case in which an optional calculator that takes inputs of Gin and G_local is used in place of the adder 106.

Through the above-described operation, the gradient sum ΣG is transmitted to the learning nodes 2-0, 2-1, and 2-3 in charge of calculation, and the learning nodes 2-0, 2-1, and 2-3 each update the configuration parameters of the neural network by using the gradient sum ΣG, which ends one cycle of the distributed learning.

As described above, according to the first embodiment, the computing interconnect device 1 executes the transmission-reception processing of communication packets between the learning nodes 2 and the All-reduce processing simultaneously in parallel. Thus, it is possible to achieve speeding-up of learning as compared to a case in which communication processing and the All-reduce processing are executed at a head node and to perform faster cooperative processing among the learning nodes 2 connected through the communication network 3.

In the first embodiment, each learning node 2 is connected with the ring communication network 3 through the computing interconnect device 1 connected in pair. Thus, when the number of connected learning nodes 2 increases, the communication band of the ring communication network 3 can be constant irrespective of the number of learning nodes 2, which is advantageous.

Second Embodiment

The following describes a second embodiment of the present invention. In the following description, a component same as that in the first embodiment described above is denoted by an identical reference sign and description thereof is omitted.

The first embodiment describes a case in which the computing interconnect device 1 performs only the All-reduce processing. However, in a distributed deep learning system according to the second embodiment, a computing interconnect device 1' also performs calculation to update configuration parameters of a neural network, which is a difference from the first embodiment.

Operation of Distributed Deep Learning System

FIGS. 17A to 17G are diagrams for description of the operation of the distributed deep learning system according to the second embodiment.

Figure 17A:
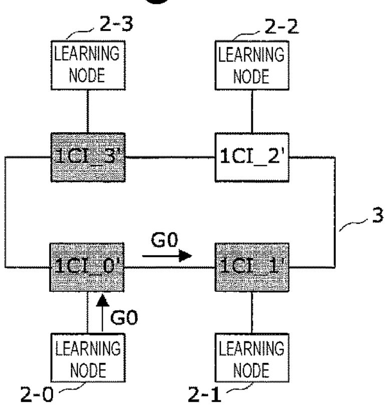
FIG. 17A is a diagram for description of the operation of a distributed deep learning system according to a second embodiment of the present invention.

As illustrated in FIG. 17A, first, the learning node 2-0 connected with a computing interconnect device 1CI_0' transmits the gradient calculation result G0 to the computing interconnect device 1CI_0'. Then, the computing interconnect device 1CI_0' forwards the gradient calculation result G0 to a computing interconnect device 1CI_1'.

Figure 17B:
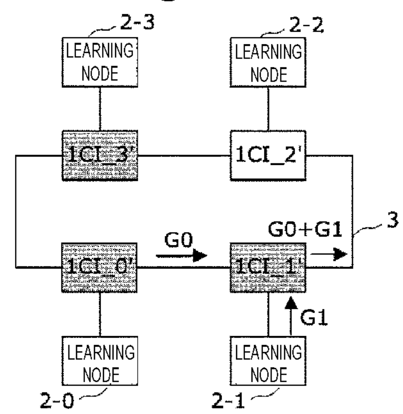
FIG. 17B is a diagram for description of the operation of the distributed deep learning system according to the second embodiment of the present invention.

As illustrated in FIG. 17B, the computing interconnect device 1CI_1' calculates the sum G0+G1 of the gradient calculation result G0 transmitted from the computing interconnect device 1CI_0' and the gradient calculation result G1 transmitted from the learning node 2-1 directly connected with the computing interconnect device 1CI_1'. The computing interconnect device 1CI_1' transmits this calculation result G0+G1 to a computing interconnect device 1CI_2' through the communication network 3.

Figure 17C:
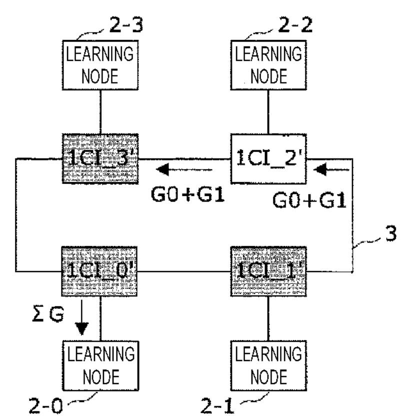
FIG. 17C is a diagram for description of the operation of the distributed deep learning system according to the second embodiment of the present invention.

As illustrated in FIG. 17C, in the present calculation, since the learning node 2-2 has non-calculation role, the computing interconnect device 1CI_2' does not perform summation on the gradient calculation result G0+G1 transmitted from the computing interconnect device 1CI_1'. The computing interconnect device 1CI_2' directly transmits the calculation result G0+G1 to a computing interconnect device 1CI_3' through the communication network 3.

Figure 17D:
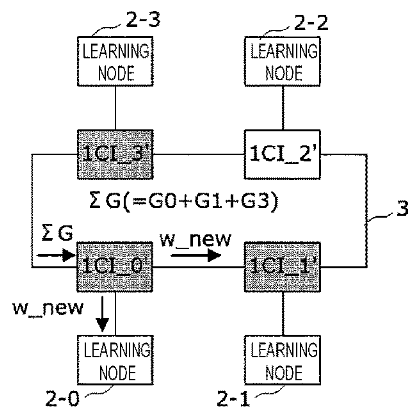
FIG. 17D is a diagram for description of the operation of the distributed deep learning system according to the second embodiment of the present invention.

As illustrated in FIG. 17D, the computing interconnect device 1CI_3' performs calculation similar to that at the computing interconnect device 1CI_1'. More specifically, the computing interconnect device 1CI_3' calculates the sum ΣG=G0+G1+G3 of the gradient sum calculation result G0+G1 transmitted from the computing interconnect device 1CI_2' and the gradient calculation result G3 transmitted from the learning node 2-3 directly connected with the computing interconnect device 1CI_3'.

The computing interconnect device 1CI_3' transmits this calculation result ΣG to the computing interconnect device 1CI_0' through the communication network 3.

As illustrated in FIG. 17D, having received the gradient sum calculation result ΣG, the computing interconnect device 1CI_0' calculates an updated value w_new of each configuration parameter of the neural network by using the gradient sum ΣG. The computing interconnect device 1CI_0' transmits this calculation result to the learning node 2-0 directly connected with the computing interconnect device 1CI_0' and to the computing interconnect device 1CI_1' through the communication network 3.

Figure 17E:
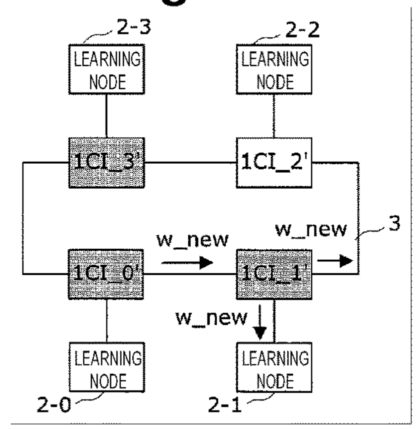
FIG. 17E is a diagram for description of the operation of the distributed deep learning system according to the second embodiment of the present invention.

As illustrated in FIG. 17E, having received the updated value w_new of each configuration parameter, the computing interconnect device 1CI_1' transmits the updated value w_new of each configuration parameter to the learning node 2-1 directly connected with the computing interconnect device 1CI_1' and to the computing interconnect device 1CI_2'.

Figure 17F:
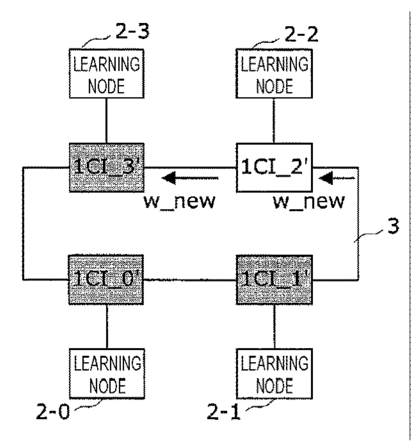
FIG. 17F is a diagram for description of the operation of the distributed deep learning system according to the second embodiment of the present invention.

As illustrated in FIG. 17F, having received the updated value w_new of each configuration parameter, the computing interconnect device 1CI_2' does not transmit the updated value w_new of each configuration parameter to the learning node 2-2 directly connected therewith but transmits the updated value w_new only to the computing interconnect device 1CI_3' through the communication network 3.

As illustrated in FIG. 17F, the computing interconnect device 1CI_3' transmits, to the learning node 2-3 directly connected with the computing interconnect device 1CI_3' and the computing interconnect device 1CI_0', the updated value w_new of each configuration parameter transmitted from the computing interconnect device 1CI_2'.

Figure 17G:
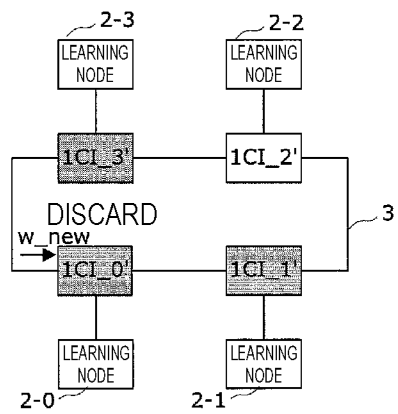
FIG. 17G is a diagram for description of the operation of the distributed deep learning system according to the second embodiment of the present invention.

Lastly, as illustrated in FIG. 17G, having received the updated value w_new of each configuration parameter, the computing interconnect device 1CI_0' discards the updated value w_new of each configuration parameter.

Through the above-described operation, the updated value w_new of each configuration parameter is transmitted to the learning nodes 2-0 to 2-2 in charge of calculation.

[Configuration of Computing Interconnect Device]

Figure 18:
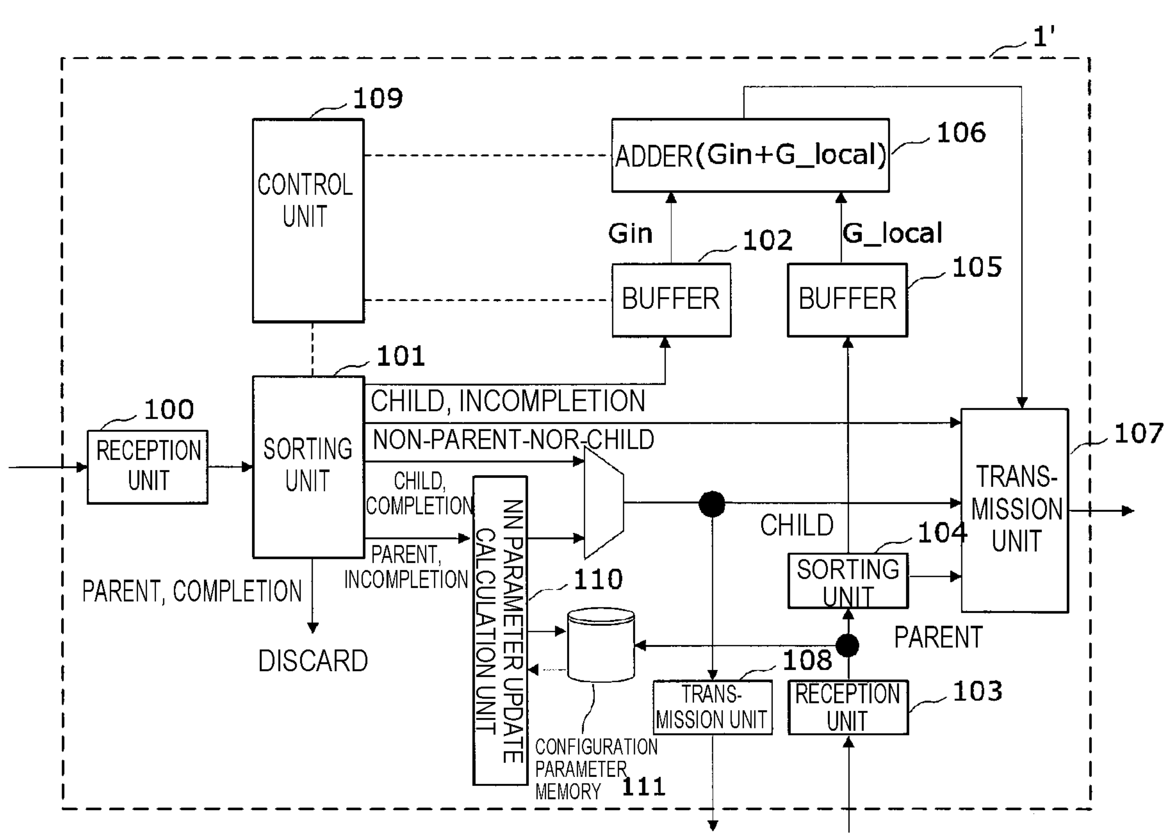
FIG. 18 is a block diagram illustrating the configuration of a computing interconnect device according to the second embodiment of the present invention.

The following describes the configuration of the computing interconnect device 1' according to the present embodiment with reference to FIG. 18. The configuration of the learning node 2 according to the present embodiment is same as that in the first embodiment.

The computing interconnect device 1' has a configuration same as that (FIG. 9) of the computing interconnect device 1 according to the first embodiment except that the computing interconnect device 1' further includes a neural network (NN) configuration parameter update calculation unit 110 and a configuration parameter memory 111.

The NN configuration parameter update calculation unit 110 performs calculation to update configuration parameters of the neural network.

The configuration parameter memory 111 stores configuration parameters received by the reception unit 103 from the learning node 2 directly connected with the computing interconnect device 1'.

Specific Example of Operation of Computing Interconnect Device

Figure 19:
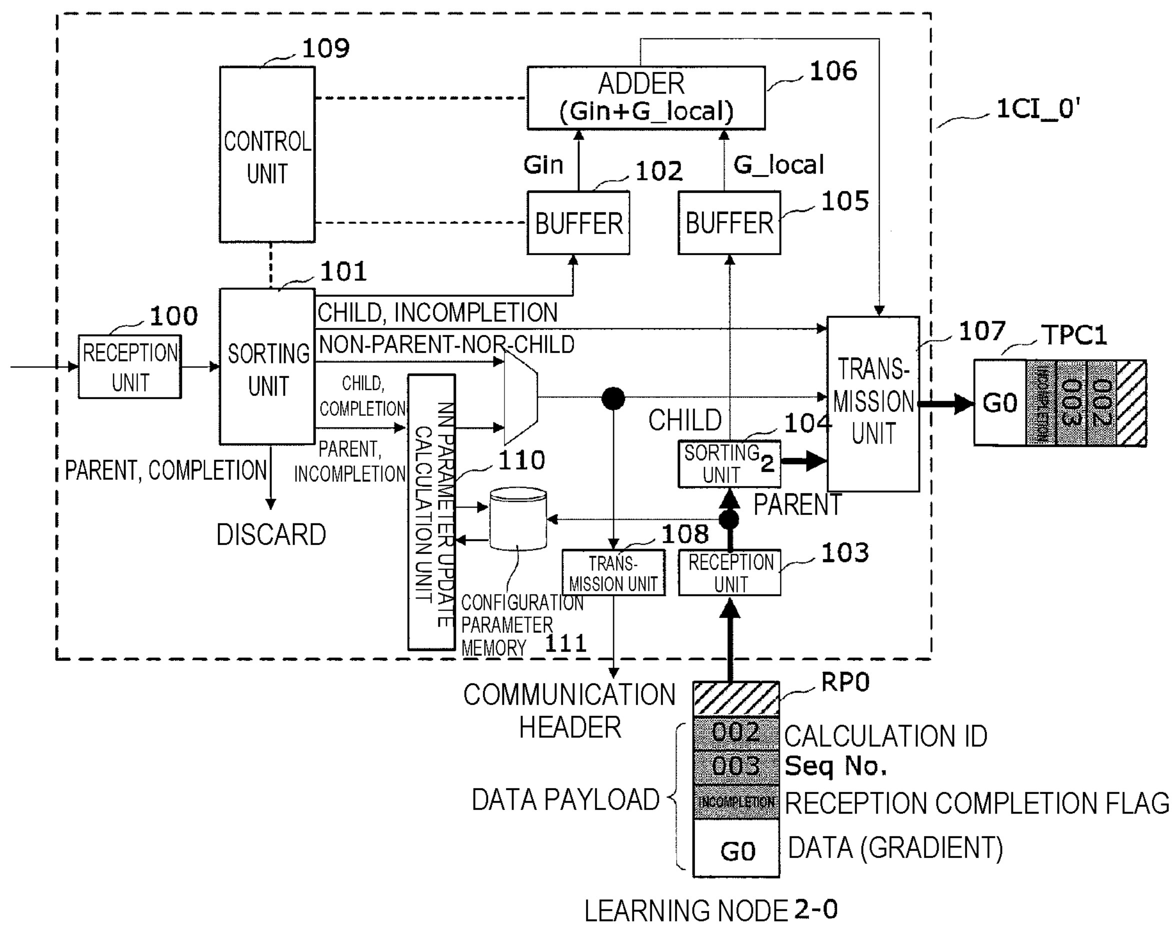
FIG. 19 is a diagram for description of the operation of a computing interconnect device (1CI_0') according to the second embodiment of the present invention.

FIG. 19 illustrates the operation of the computing interconnect device 1CI_0' in FIG. 17A.

The gradient value "G0" calculated at the learning node 2-0, the calculation ID "002", the sequential number "003" of the gradient value, and the reception completion flag "incompletion" are stored in the data payload of a communication packet RP0 transmitted from the learning node 2-0.

The reception unit 103 of the computing interconnect device 1CI_0' takes the gradient value G0, the calculation ID, the sequential number, and the reception completion flag out of the data payload of the received communication packet RP0 and passes these data to the sorting unit 104.

The sorting unit 104 refers to the calculation information table with the calculation ID received from the reception unit 103 and identifies that the computing interconnect device 1CI_0' is to operate as a "parent" for calculation ID=2. Accordingly, the sorting unit 104 passes the gradient value G0, the calculation ID, the sequential number, and the reception completion flag to the transmission unit 107.

The transmission unit 107 stores, in the data payload of the communication packet TPC1, the gradient value G0, the calculation ID, the sequential number, and the reception completion flag received from the sorting unit 104 and transmits the communication packet TPC1 to an adjacent computing interconnect device (in the example of FIG. 17A, the computing interconnect device 1CI_1') on the downstream side through the communication network 3.

Figure 20:
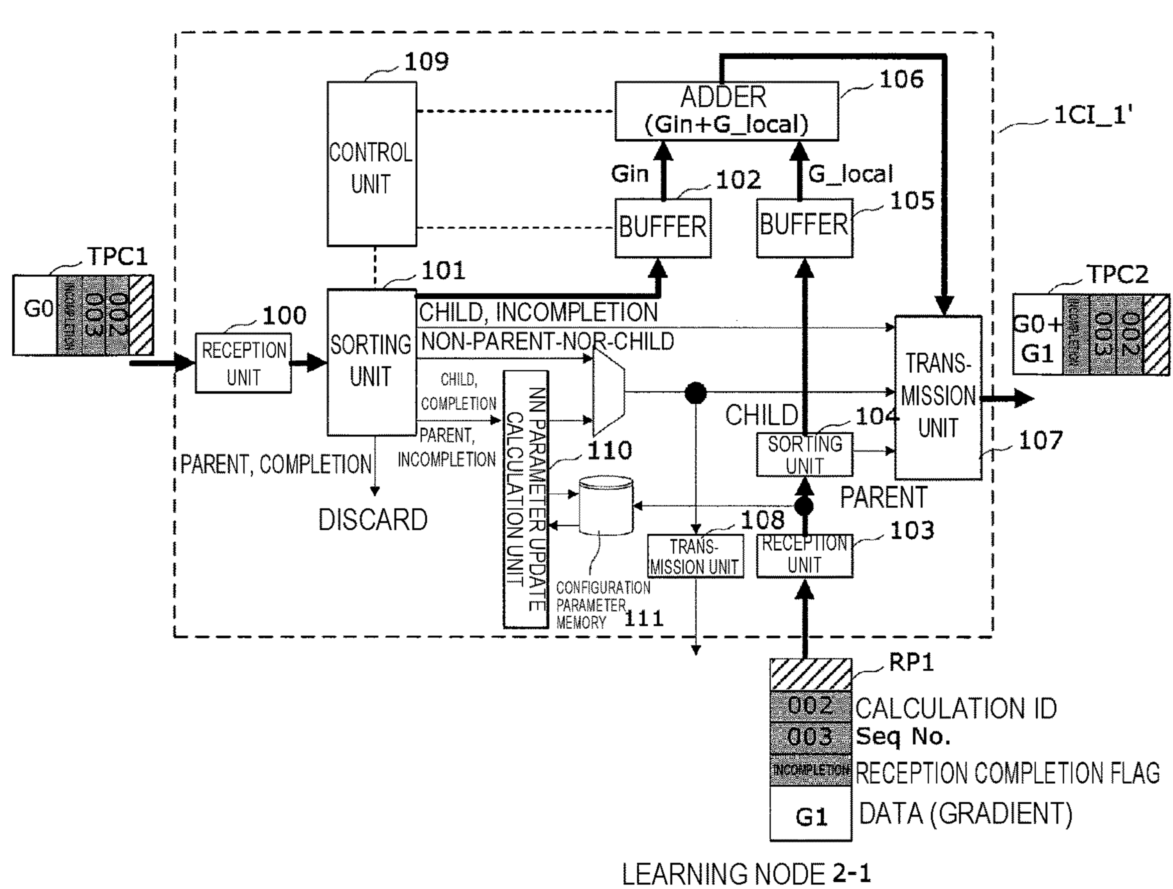
FIG. 20 is a diagram for description of the operation of a computing interconnect device (1CI_1') according to the second embodiment of the present invention.

FIG. 20 illustrates the operation of the computing interconnect device 1CI_1' in FIG. 17B.

The reception unit 100 of the computing interconnect device 1CI_1' takes the gradient value G0, the calculation ID, the sequential number, and the reception completion flag out of the data payload of the communication packet TPC1 received from the computing interconnect device 1CI_0' and passes these data to the sorting unit 101.

The sorting unit 101 identifies that the reception completion flag received from the reception unit 100 indicates "incompletion" and the computing interconnect device 1CI_1' is to operate as a "child" for calculation ID=2 by referring to the calculation information table with the received calculation ID. Accordingly, the sorting unit 101 stores the gradient value G0, the calculation ID, the sequential number, and the reception completion flag in the buffer memory 102.

The reception unit 103 of the computing interconnect device 1CI_1' takes the gradient value G1, the calculation ID, the sequential number, and the reception completion flag out of the data payload of the communication packet RP1 received from the learning node 2-1 directly connected with the computing interconnect device 1CI_1' and passes these data to the sorting unit 104.

The sorting unit 104 refers to the calculation information table with the calculation ID received from the reception unit 103 and identifies that the computing interconnect device 1CI_1' is to operate as a "child" for calculation ID=2. Accordingly, the sorting unit 104 stores the gradient value G0, the calculation ID, the sequential number, and the reception completion flag in the buffer memory 105.

When the gradient values "G0" and "G1" of an identical sequential number are stored in the buffer memory 102 and the buffer memory 105, the control unit 109 of the computing interconnect device 1CI_1' reads the gradient value G0, the sequential number, and the reception completion flag from the buffer memory 102. In addition, the control unit 109 reads the gradient value G1, the sequential number, and the reception completion flag from the buffer memory 105 and passes the gradient values "G0" and "G1" to the adder.

The adder 106 adds the gradient values "G0" and "G1". The control unit 109 passes the calculation ID, the sequential number, and the reception completion flag read from the buffer memory 102 to the transmission unit 107.

The transmission unit 107 of the computing interconnect device 1CI_1' stores, in the data payload of the communication packet TPC2, the gradient sum "G0+G1" calculated by the adder 106, the calculation ID, the sequential number, and the reception completion flag received from the control unit 109. Then, the transmission unit 107 transmits the communication packet TPC2 to the adjacent computing interconnect device (in the example of FIG. 17B, the computing interconnect device 1CI_2') on the downstream side of the computing interconnect device 1CI_1' through the communication network 3.

Figure 21:
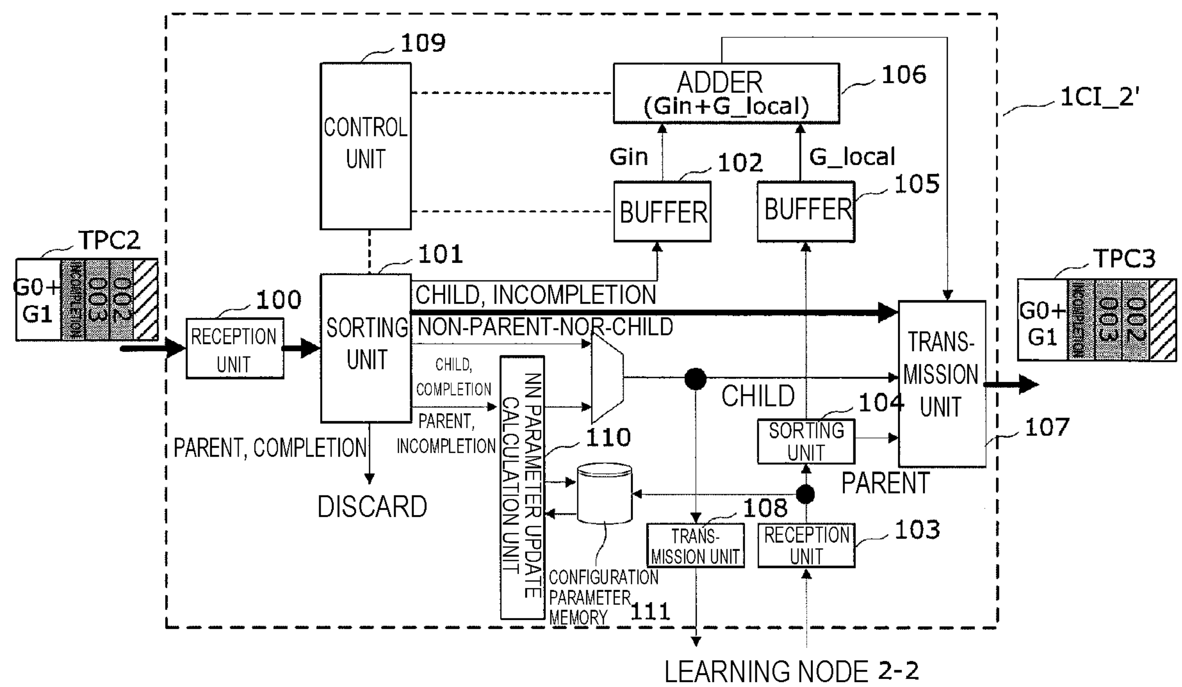
FIG. 21 is a diagram for description of the operation of a computing interconnect device (1CI_2') according to the second embodiment of the present invention.

FIG. 21 illustrates the operation of the computing interconnect device 1CI_2' in FIG. 17C.

The reception unit 100 of the computing interconnect device 1CI_2' takes the gradient value G0+G1, the calculation ID, the sequential number, and the reception completion flag out of the data payload of the communication packet TPC2 received from the computing interconnect device 1CI_1' and passes these data to the sorting unit 101.

The sorting unit 101 refers to the calculation information table with the received calculation ID and identifies that the computing interconnect device 1CI_2' is to operate as a "non-calculation role (non-parent-nor-child)" for calculation ID=2. Accordingly, the sorting unit 101 transmits the gradient value G0+G1, the calculation ID, the sequential number, and the reception completion flag to the transmission unit 107.

The transmission unit 107 stores, in the data payload of the communication packet TPC3, the gradient value G0+G1, the calculation ID, the sequential number, and the reception completion flag received from the sorting unit 101. The transmission unit 107 transmits the communication packet TPC3 to the adjacent computing interconnect device (in the example of FIG. 17C, the computing interconnect device 1CI_3') on the downstream side of the computing interconnect device 1CI_2' through the communication network 3.

Figure 22:
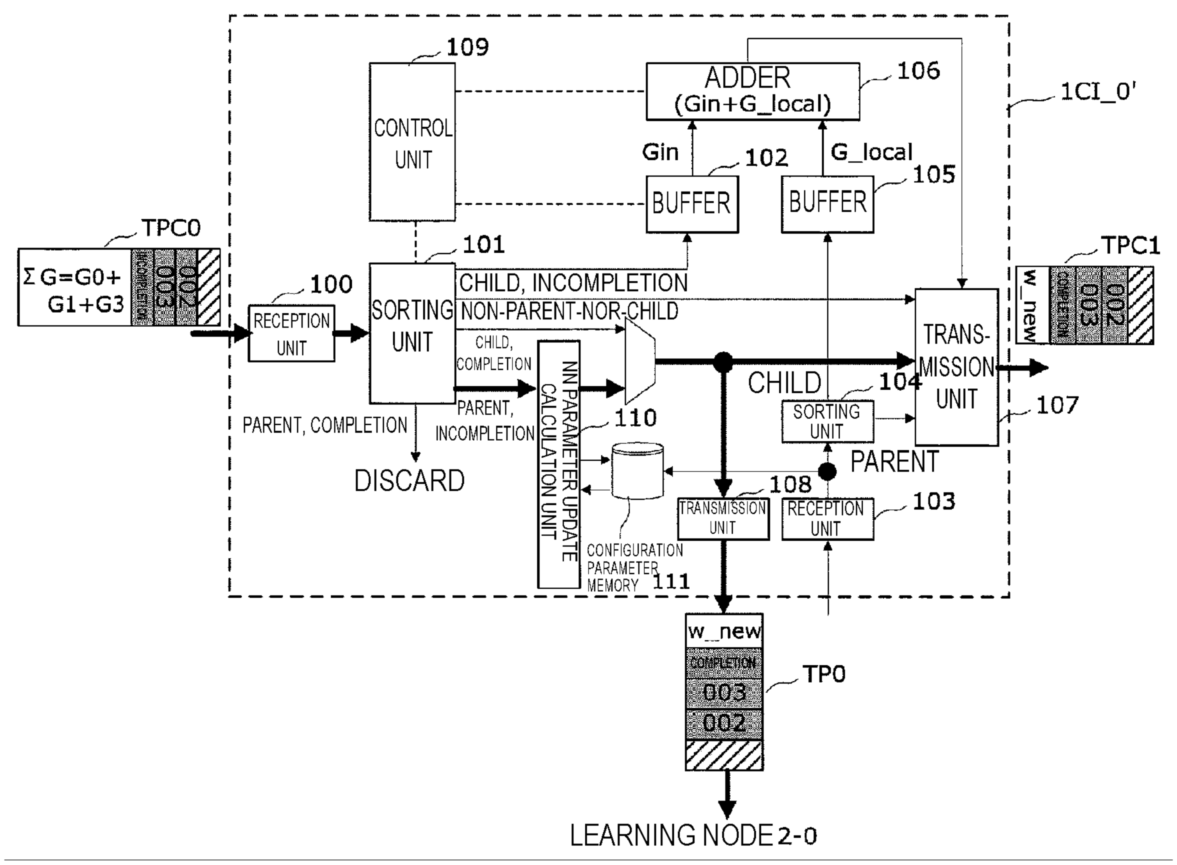
FIG. 22 is a diagram for description of the operation of the computing interconnect device (1CI_0') according to the second embodiment of the present invention.

FIG. 22 illustrates the operation of the computing interconnect device 1CI_0' in FIG. 17D.

The reception unit 100 of the computing interconnect device 1CI_0' takes the gradient sum ΣG, the calculation ID, the sequential number, and the reception completion flag out of the payload of the communication packet TPC0 received from the adjacent computing interconnect device (in the example of FIG. 17D, the computing interconnect device 1CI_3') on the upstream side of the computing interconnect device 1CI_0' and passes these data to the sorting unit 101.

The sorting unit 101 identifies that the reception completion flag received from the reception unit 100 indicates "incompletion" and the computing interconnect device 1CI_0' is to operate as a "parent" for calculation ID=2 by referring to the calculation information table with the received calculation ID.

Accordingly, the sorting unit 101 passes the gradient sum ΣG, the calculation ID, the sequential number, and the reception completion flag to the NN configuration parameter update calculation unit 110. In this case, the sorting unit 101 changes the reception completion flag received from the reception unit 100 from "incompletion" to a value indicating "completion" and then passes the reception completion flag to the NN configuration parameter update calculation unit 110.

At the start of learning, the same initial values of configuration parameters are set to the neural networks of the learning nodes 2-0, 2-1, and 2-3 in charge of calculation. The initial values of configuration parameters are stored in the configuration parameter memory 111 of the computing interconnect device 1CI_0'.

The NN configuration parameter update calculation unit 110 calculates, for each configuration parameter, the updated value w_new of the configuration parameter of the neural network based on the gradient sum ΣG received from the sorting unit 101 and a value w_old of the configuration parameter stored in the configuration parameter memory 111.

The NN configuration parameter update calculation unit 110 outputs, to the transmission units 107 and 108, this calculation result and the calculation ID, the sequential number, and the reception completion flag received from the sorting unit 101. The NN configuration parameter update calculation unit 110 performs calculation as indicated by Formula (3) when using, for example, the gradient descent as the update method.

Simultaneously with outputting of the updated value w_new of each configuration parameter to the transmission units 107 and 108, the NN configuration parameter update calculation unit 110 overwrites the value of the configuration parameter stored in the configuration parameter memory 111 with the updated value w_new.

The transmission unit 107 stores, in the data payload of the communication packet TPC1, the updated value w_new of each configuration parameter, the calculation ID, the sequential number, and the reception completion flag received from the NN configuration parameter update calculation unit 110. The transmission unit 107 transmits the communication packet TPC1 to the adjacent computing interconnect device (in the example of FIG. 17D, the computing interconnect device 1CI_1') on the downstream side of the computing interconnect device 1CI_0' through the communication network 3.

The transmission unit 108 of the computing interconnect device 1CI_0' stores, in the data payload of the communication packet TP0, the updated value w_new of each configuration parameter, the calculation ID, the sequential number, and the reception completion flag received from the NN configuration parameter update calculation unit 110 and transmits the communication packet TP0 to the learning node 2-0.

Figure 23:
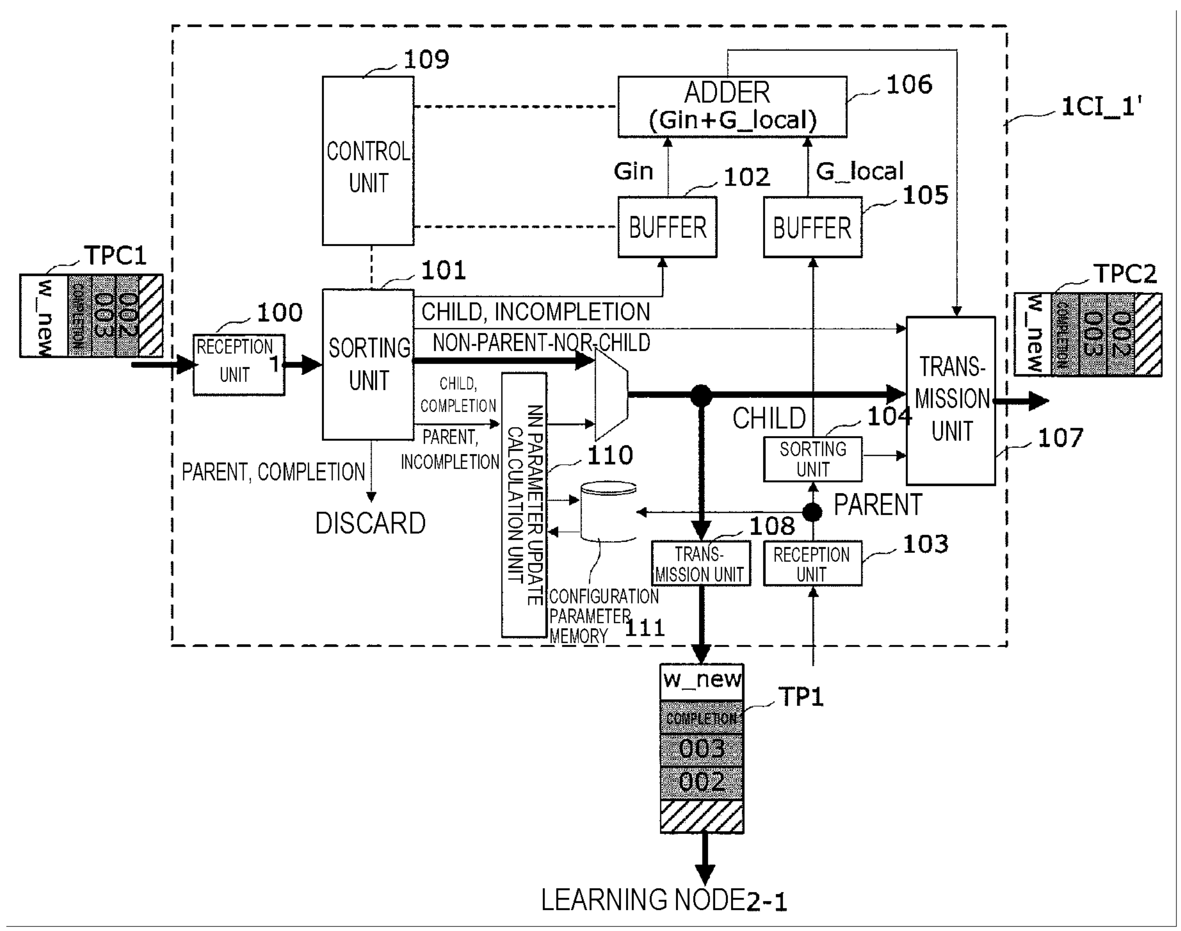
FIG. 23 is a diagram for description of the operation of the computing interconnect device (1CI_1') according to the second embodiment of the present invention.

FIG. 23 illustrates the operation of the computing interconnect device 1CI_1' in FIG. 17E.

The reception unit 100 of the computing interconnect device 1CI_1' takes the updated value w_new of each configuration parameter, the calculation ID, the sequential number, and the reception completion flag out of the data payload of the communication packet TPC1 received from the computing interconnect device 1CI_0' and passes these data to the sorting unit 101.

The sorting unit 101 identifies that the reception completion flag received from the reception unit 100 indicates "completion" and the computing interconnect device 1CI_1' is to operate as a "child" for calculation ID=2 by referring to the calculation information table with the received calculation ID. Accordingly, the sorting unit 101 passes the updated value w_new of each configuration parameter, the calculation ID, the sequential number, and the reception completion flag to the transmission unit 107 and the transmission unit 108.

The transmission unit 107 stores, in the data payload of the communication packet TPC2, the updated value w_new of each configuration parameter, the calculation ID, the sequential number, and the reception completion flag received from the sorting unit 101. Then, the transmission unit 107 transmits the communication packet TPC2 to the adjacent computing interconnect device (in the example of FIG. 17E, the computing interconnect device 1CI_2') on the downstream side of the computing interconnect device 1CI_1' through the communication network 3.

The transmission unit 108 stores, in the data payload of the communication packet TP1, the updated value w_new of each configuration parameter, the calculation ID, the sequential number, and the reception completion flag received from the sorting unit 101 and transmits the communication packet TP1 to the learning node 2-1.

Figure 24:
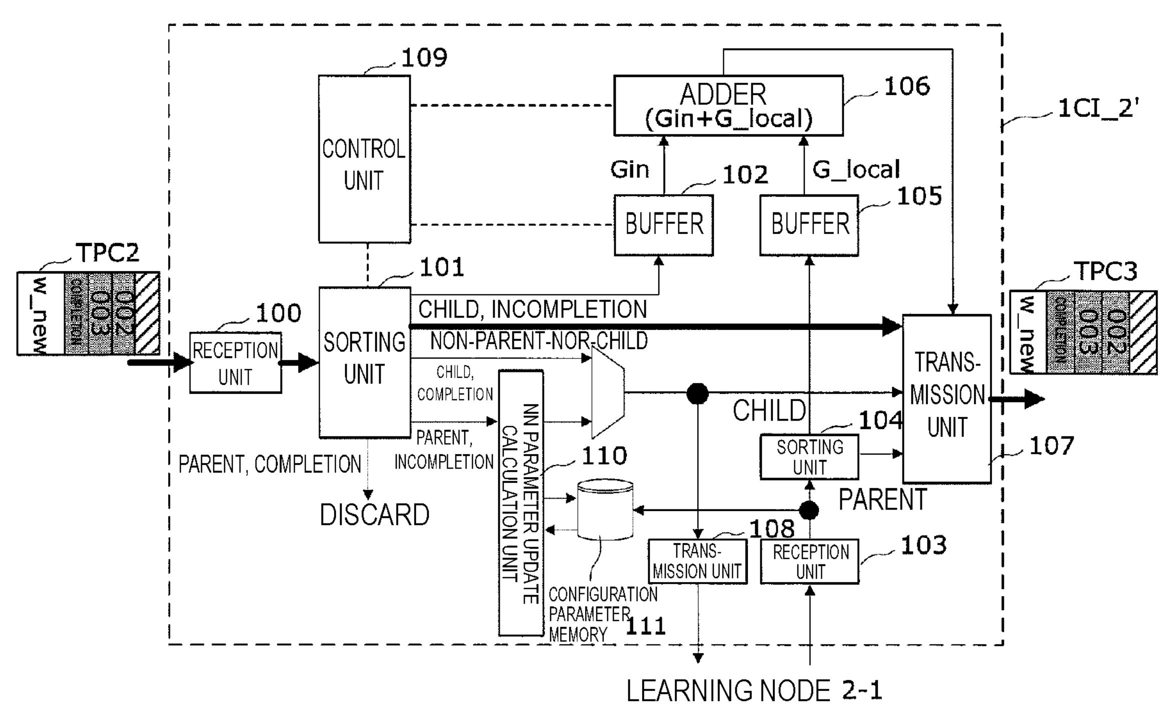
FIG. 24 is a diagram for description of the operation of the computing interconnect device (1CI_2') according to the second embodiment of the present invention.

FIG. 24 illustrates the operation of the computing interconnect device 1CI_2' in FIG. 17F.

The reception unit 100 of the computing interconnect device 1CI_2' takes the updated value w_new of each configuration parameter, the calculation ID, the sequential number, and the reception completion flag out of the data payload of the communication packet TPC2 received from the computing interconnect device 1CI_1' and passes these data to the sorting unit 101.

The sorting unit 101 refers to the calculation information table with the received calculation ID and identifies that the computing interconnect device 1CI_2' is to operate as a "non-calculation role (non-parent-nor-child)" for calculation ID=2. Accordingly, the sorting unit 101 transmits the updated value w_new of each configuration parameter, the calculation ID, the sequential number, and the reception completion flag to the transmission unit 107.

The transmission unit 107 stores, in the data payload of the communication packet TPC3, the updated value w_new of each configuration parameter, the calculation ID, the sequential number, and the reception completion flag received from the sorting unit 101. Thereafter, the transmission unit 107 transmits the communication packet TPC3 to the adjacent computing interconnect device (in the example of FIG. 17F, the computing interconnect device 1CI_3') on the downstream side of the computing interconnect device 1CI_2' through the communication network 3.

Figure 25:
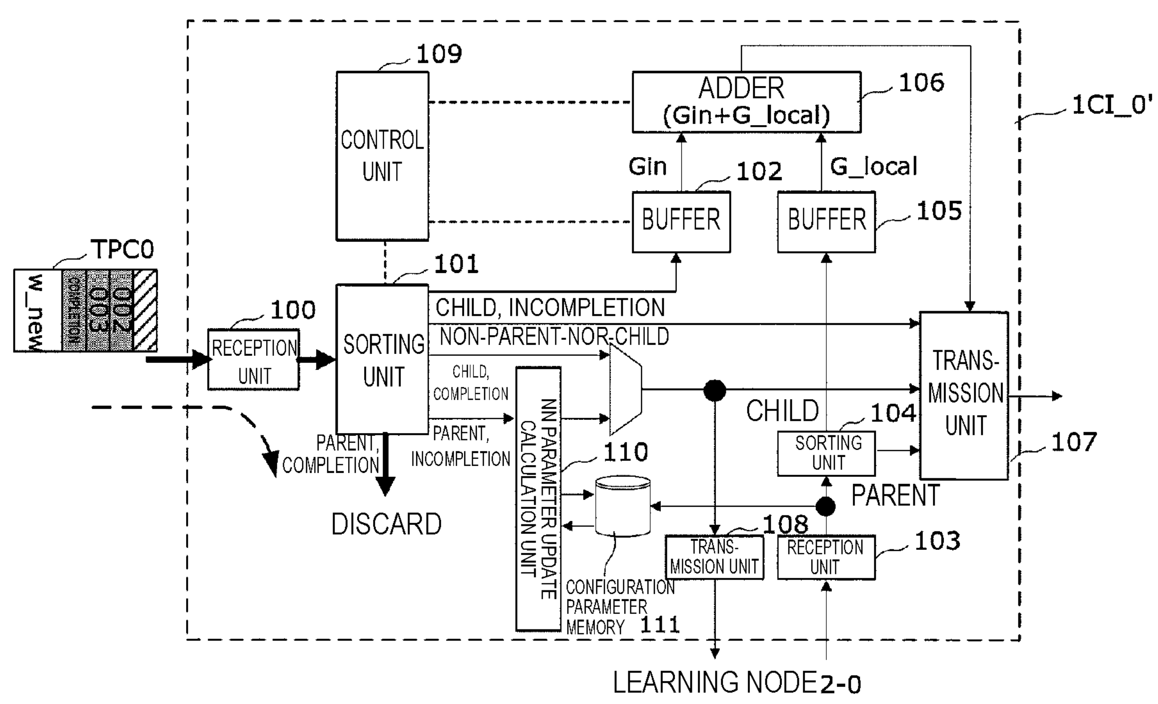
FIG. 25 is a diagram for description of the operation of the computing interconnect device (1CI_0') according to the second embodiment of the present invention.
Figure 26:
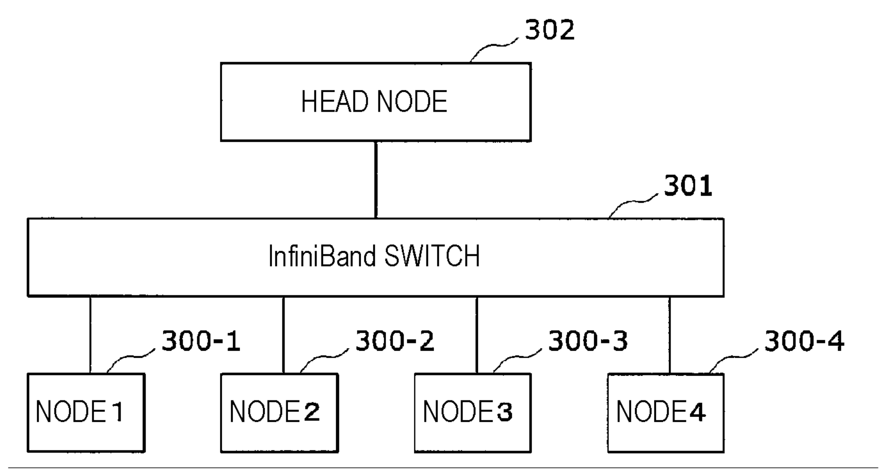
FIG. 26 is a block diagram illustrating the configuration of a conventional distributed deep learning system.

FIG. 25 illustrates the operation of the computing interconnect device 1CI_0' in FIG. 17G.

The reception unit 100 of the computing interconnect device 1CI_0' takes the updated value w_new of each configuration parameter, the sequential number, and the reception completion flag out of the payload of the communication packet TPC0 received from the adjacent computing interconnect device (in the example of FIG. 17G, the computing interconnect device 1CI_3') on the upstream side of the computing interconnect device 1CI_0' and passes these data to the sorting unit 101.

The sorting unit 101 identifies that the reception completion flag received from the reception unit 100 indicates "completion" and the computing interconnect device 1CI_0' is to operate as a "parent" for calculation ID=2 by referring to the calculation information table with the received calculation ID. Thereafter, the sorting unit 101 discards the updated value w_new of each configuration parameter, the calculation ID, the sequential number, and the reception completion flag received from the reception unit 100.

Through the above-described operation, the updated value w_new of each configuration parameter is transmitted to the learning nodes 2-0, 2-1, and 2-3 in charge of calculation. The learning nodes 2-0, 2-1, and 2-3 in charge of calculation each update the neural network 26 by overwriting a configuration parameter of the neural network 26, which is specified by a sequential number, with the updated value w_new of each configuration parameter.

In the above-described example, the sum of gradients is used to perform the weight-parameter update processing but, when a weighted sum of gradients is used in place of the sum of gradients, a weighted sum calculator for Gin and G_local may be used in place of the adder 106, similarly to the first embodiment. Alternatively, when the squared sum of gradients is used in place of the sum of gradients, a squared sum calculator for Gin and G_local may be used in place of the adder 106. In other words, embodiments of the present invention are also applicable to a case in which an optional calculator that takes inputs of Gin and G_local is used in place of the adder 106.

As described above, according to the second embodiment, since a dedicated calculation circuit of the NN parameter update calculation unit 110 configured to perform arithmetic processing to update the configuration parameters of the neural network is provided, it is possible to achieve further speeding-up of the learning processing. Moreover, for the gradient sum calculation and also for the configuration parameter update calculation, the same calculation may be independently performed for each configuration parameter irrespective of the configuration of the neural network 26 included in the learning node 2. Thus, even when the configuration of the neural network 26 included in any of the learning nodes 2-0 to 2-3 is changed, the same dedicated calculation circuit can be used as the calculator of the computing interconnect device 1', which is advantageous.

Furthermore, according to the second embodiment, the computing interconnect device 1' can execute fast hardware processing of the transmission-reception processing of communication packets between the learning nodes 2 and the All-reduce processing simultaneously in parallel. Thus, it is possible to achieve speeding-up of learning as compared to a case in which communication processing and the All-reduce processing are executed at a head node through software, as in the conventional technology, and to perform faster cooperative processing among the learning nodes 2 connected through the communication network 3.

In the second embodiment, each learning node 2 is connected with the ring communication network 3 through the computing interconnect device 1 connected in pair. Thus, when the number of connected learning nodes 2 increases, the communication band of the ring communication network 3 can be constant irrespective of the number of learning nodes 2, which is advantageous.

Although the embodiments of a distributed deep learning system, a distributed deep learning method, and a computing interconnect device according to the present invention are described above, the present invention is not limited to the above-described embodiments, but may be provided with various modifications that could be thought of by the skilled person in the art within the range of the invention recited in the claims.

REFERENCE SIGNS LIST

1, 1', 1CI_0 to 1CI_3 computing interconnect device
2, 2-0 to 2-3 learning node
3 communication network
20 input unit
21 loss function calculation unit
22 gradient calculation unit
23 transmission unit
24 reception unit
25 configuration parameter update unit
26 neural network
100, 103 reception unit
101, 104 sorting unit
102, 105 buffer memory
106 adder
107, 108 transmission unit
109 control unit
110 NN parameter update calculation unit
111 configuration parameter memory.

The invention claimed is:

1. A distributed deep learning system comprising:

a plurality of computing interconnect devices connected with each other through a ring communication network through which communication is possible in one direction; and a plurality of learning nodes connected with the plurality of computing interconnect devices in a one-to-one relation;

wherein each computing interconnect device of the plurality of computing interconnect devices includes:

a first reception unit configured to receive a first packet from a learning node of the plurality of learning nodes and acquire node data stored in the first packet, the learning node being connected with the computing interconnect device;

a second reception unit configured to receive a second packet from a second computing interconnect device of the plurality of computing interconnect devices that is adjacent to the computing interconnect device and acquire forwarding data stored in the second packet, wherein the second computing interconnect device is upstream from the computing interconnect device;

a first sorting unit configured to sort the forwarding data in accordance with a second reception completion flag included in the second packet and a role allocated to the computing interconnect device in advance, wherein the second reception completion flag indicates completion or incompletion of reception of the second packet;

a second sorting unit configured to sort the node data in accordance with a first reception completion flag included in the first packet and the role, wherein the first reception completion flag indicates completion or incompletion of reception of the first packet;

a first transmission unit configured to in response to the first sorting unit sorting the forwarding data to the first transmission unit or the second sorting unit sorting the node data to the first transmission unit, packetize the node data sorted by the second sorting unit or the forwarding data sorted by the first sorting unit into first packetized data and transmit the first packetized data to a third computing interconnect device adjacent to the computing interconnect device, wherein the third computing interconnect device is downstream from the computing interconnect device; and a second transmission unit configured to in response to the first sorting unit sorting the forwarding data to the second transmission unit, packetize the forwarding data sorted by the first sorting unit into second packetized data and transmit the second packetized data to the learning node connected to the computing interconnect device;

wherein the first sorting unit is configured to sort the forwarding data to the first transmission unit and the second transmission unit when the second reception completion flag indicates incompletion of reception of the second packet and the role is a parent;

wherein the first sorting unit is configured to discard the forwarding data when the second reception completion flag indicates completion of reception of the second packet and the role is a parent;

wherein the second sorting unit sorts the node data to the first transmission unit when the first reception completion flag indicates incompletion of reception of the first packet and the role is a parent; and wherein each learning node of the plurality of learning nodes includes:

a neural network configured to output a calculation result upon inputting of learning data;

a third transmission unit configured to packetize data into third packetized data and transmit the third packetized data to the computing interconnect device connected with the learning node;

a third reception unit configured to receive the second packetized data from the computing interconnect device connected with the learning node and acquire the forwarding data stored in the second packetized data when the second packetized data is transmitted to the learning node; and a configuration parameter update unit configured to update configuration parameter data of the neural network based on the forwarding data.

2. The distributed deep learning system according to claim 1, wherein:

each computing interconnect device further includes a calculator configured to perform calculation based on inputting the forwarding data and the node data in response to the forwarding data being sorted by the first sorting unit to the calculator and second node data being sorted by the second sorting unit to the calculator;

the first sorting unit sorts the forwarding data to the calculator when the second reception completion flag indicates incompletion of reception of the second packet and the role is a child;

the second sorting unit sorts the node data to the calculator when the first reception completion flag indicates incompletion of reception of the first packet and the role is a child; and the calculator outputs, to the first transmission unit, a result of the calculation based on inputting of the forwarding data and the node data.

3. The distributed deep learning system according to claim 1, wherein:

each computing interconnect device further includes:

a configuration parameter memory configured to store the node data; and a configuration parameter update calculation unit configured to calculate updated configuration parameter data based on inputting of the forwarding data sorted by the first sorting unit and data stored in the configuration parameter memory and update the data stored in the configuration parameter memory;

the first sorting unit sorts the forwarding data to the configuration parameter update calculation unit when the second reception completion flag indicates incompletion of reception of the second packet and the role is a parent;

the configuration parameter update calculation unit outputs the updated configuration parameter data to the first transmission unit and the second transmission unit;

the first transmission unit of each computing interconnect device is configured to packetize the updated configuration parameter data into a fourth packetized data and transmits the fourth packetized data to the third computing interconnect device adjacent to the computing interconnect device; and the second transmission unit of each computing interconnect device is configured to packetize the updated configuration parameter data into fifth packetized data and transmits the fifth packetized data to the learning node connected with the computing interconnect device.

4. A distributed deep learning method in a distributed deep learning system, the distributed deep learning method comprising:

performing, by each computing interconnect device of a plurality of computing interconnect devices, the following steps:

a first reception step in which each computing interconnect device of a plurality of computing interconnect devices receives a first packet transmitted from a learning node connected with a computing interconnect device and acquires node data stored in the first packet, wherein the distributed deep learning system comprises:

the plurality of computing interconnect devices, the plurality of computing interconnect devices connected with each other through a ring communication network through which communication is possible in one direction, and a plurality of learning nodes connected with the plurality of computing interconnect devices in a one-to-one relation, a second reception step in which the computing interconnect device receives a second packet from a second computing interconnect device of the plurality of computing interconnect devices that is adjacent to the computing interconnect device and acquires forwarding data stored in the second packet, wherein the second computing interconnect device is upstream from the computing interconnect device;

a first sorting step in which the computing interconnect device sorts the forwarding data in accordance with a second reception completion flag included in the second packet and a role allocated to the computing interconnect device in advance, wherein the second reception completion flag indicates completion or incompletion of reception of the second packet;

a second sorting step in which the computing interconnect device sorts the node data in accordance with a first reception completion flag included in the first packet and the role, wherein the first reception completion flag indicates completion or incompletion of reception of the first packet;

a first transmission step in which the computing interconnect device packetizes the node data sorted in the second sorting step or the forwarding data sorted in the first sorting step into first packetized data and transmits the first packetized data to a third computing interconnect device adjacent to the computing interconnect device, wherein the third computing interconnect device is downstream from the computing interconnect device; and a second transmission step in which the computing interconnect device packetizes the forwarding data sorted in the first sorting step into second packetized data and transmits the second packetized data to the learning node connected to the computing interconnect device;

performing, by each learning node of the plurality of learning nodes, the following steps:

a neural network calculation step in which the learning node inputs learning data to a neural network and outputs a calculation result;

a third transmission step in which the learning node packetizes data into third packetized data and transmits the third packetized data to the computing interconnect device connected with the learning node;

a third reception step in which the learning node receives the second packetized data from the computing interconnect device connected with the learning node and acquires the forwarding data stored in the second packetized data; and a configuration parameter update step in which the learning node updates configuration parameter data of the neural network based on the forwarding data acquired in the third reception step.

5. The distributed deep learning method according to claim 4, further comprising:

a configuration parameter storage step in which each computing interconnect device of the plurality of computing interconnect devices stores the node data in a configuration parameter memory; and a configuration parameter update calculation step in which each computing interconnect device of the plurality of computing interconnect devices calculates updated configuration parameter data upon inputting of the forwarding data sorted at the first sorting step and data stored in the configuration parameter memory and updates the data stored in the configuration parameter memory.

6. A computing interconnect device comprising:

a first reception unit configured to receive a first packet transmitted from a learning node connected with the computing interconnect device and acquire node data stored in the first packet, wherein the computing interconnect device is one of a plurality of computing interconnect devices connected with each other through a ring communication network through which communication is possible in one direction;

a second reception unit configured to receive a second packet from a second computing interconnect device of the plurality of computing interconnect devices that is adjacent to the computing interconnect device and acquire forwarding data stored in the second packet, wherein the second computing interconnect device is upstream from the computing interconnect device;

a first sorting unit configured to sort the forwarding data in accordance with a second reception completion flag included in the second packet and a role allocated to the computing interconnect device in advance, wherein the second reception completion flag indicates completion or incompletion of reception of the second packet;

second sorting unit configured to sort the node data in accordance with a first reception completion flag included in the first packet and the role, wherein the first reception completion flag indicates completion or incompletion of reception of the first packet;

a first transmission unit configured to in response to the first sorting unit sorting the forwarding data to the first transmission unit or the second sorting unit sorting the node data to the first transmission unit, packetize the node data sorted by the second sorting unit or the forwarding data sorted by the first sorting unit into first packetized data and transmit the first packetized data to a third computing interconnect device adjacent to the computing interconnect device, wherein the third computing interconnect device is downstream from the computing interconnect device; and a second transmission unit configured to in response to the first sorting unit sorting the forwarding data to the second transmission unit, packetize the forwarding data sorted by the first sorting unit into second packetized data and transmit the second packetized data to the learning node connected to the computing interconnect device;

wherein the first sorting unit is configured to sort the forwarding data to the first transmission unit and the second transmission unit when the second reception completion flag indicates incompletion of reception of the second packet and the role is a parent;

wherein the first sorting unit is configured to discard the forwarding data when the second reception completion flag indicates completion of reception of the second packet and the role is a parent; and wherein the second sorting unit sorts the node data to the first transmission unit when the first reception completion flag indicates incompletion of reception of the first packet and the role is a parent.

7. The computing interconnect device according to claim 6, further comprising:

a calculator configured to perform calculation based on inputting the forwarding data and the node data in response to the forwarding data being sorted by the first sorting unit to the calculator and second node data being sorted by the second sorting unit to the calculator;

wherein the first sorting unit sorts the forwarding data to the calculator when the second reception completion flag indicates incompletion of reception of the second packet and the role is a child;

wherein the second sorting unit sorts the node data to the calculator when the first reception completion flag indicates incompletion of reception of the first packet and the role is a child; and wherein the calculator outputs, to the first transmission unit, a result of the calculation based on inputting of the forwarding data and the node data.

8. The computing interconnect device according to claim 6, further comprising:

a configuration parameter memory configured to the node data; and a configuration parameter update calculation unit configured to calculate updated configuration parameter data based on inputting of the forwarding data sorted by the first sorting unit and data stored in the configuration parameter memory and update the data stored in the configuration parameter memory;

wherein the first sorting unit sorts the forwarding data to the configuration parameter update calculation unit when the second reception completion flag indicates incompletion of reception of the second packet and the role is a parent;

wherein the configuration parameter update calculation unit outputs the updated configuration parameter data to the first transmission unit and the second transmission unit;

wherein the first transmission unit is configured to packetize the updated configuration parameter data into a fourth packetized data and transmits the fourth packetized data to the third computing interconnect device; and wherein the second transmission unit of each computing interconnect device is configured to packetize the updated configuration parameter data into fifth packetized data and transmit the fifth packetized data to the learning node.

9. The computing interconnect device according to claim 6, and wherein the plurality of the computing interconnect devices is connected with a plurality of learning nodes in a one-to-one relation.

* * * * *